(12) United States Patent
Kim et al.

(10) Patent No.: US 11,570,486 B2
(45) Date of Patent: Jan. 31, 2023

(54) METHOD AND APPARATUS FOR TRANSMITTING VIDEO CONTENT USING EDGE COMPUTING SERVICE

(71) Applicant: Samsung Electronics Co., Ltd., Suwon-si (KR)

(72) Inventors: Jiwon Kim, Suwon-si (KR); Eunji Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 60 days.

(21) Appl. No.: 17/183,835

(22) Filed: Feb. 24, 2021

(65) Prior Publication Data
US 2021/0266609 A1  Aug. 26, 2021

(30) Foreign Application Priority Data
Feb. 24, 2020 (KR) ........................ 10-2020-0022377

(51) Int. Cl.
*H04N 21/218* (2011.01)
*H04N 21/222* (2011.01)
(Continued)

(52) U.S. Cl.
CPC ..... *H04N 21/21805* (2013.01); *G06T 19/006* (2013.01); *H04N 13/161* (2018.05);
(Continued)

(58) Field of Classification Search
CPC ........... H04N 13/161; H04N 21/21805; H04N 21/222; H04N 21/2225; H04N 21/226;
(Continued)

(56) References Cited

U.S. PATENT DOCUMENTS

| 8,397,269 B2 | 3/2013 | Barrett et al. |
| 9,922,461 B2 | 3/2018 | Yang et al. |
| (Continued) | | |

FOREIGN PATENT DOCUMENTS

| CN | 102056015 | 5/2011 |
| CN | 105933343 | 9/2016 |
| (Continued) | | |

OTHER PUBLICATIONS

Search Report and Written Opinion dated Jun. 11, 2021 in counterpart International Patent Application No. PCT/KR2021/002328.
(Continued)

*Primary Examiner* — Farzana Hossain
(74) *Attorney, Agent, or Firm* — Nixon & Vanderhye, P.C.

(57) ABSTRACT

An example method, performed by an edge data network, of transmitting video content includes: obtaining first bearing information from an electronic device connected to the edge data network; determining second predicted bearing information based on the first bearing information; determining a second predicted partial image corresponding to the second predicted bearing information; transmitting, to the electronic device, a second predicted frame generated by encoding the second predicted partial image; obtaining, from the electronic device, second bearing information corresponding to a second partial image; comparing the second predicted bearing information to the obtained second bearing information; generating, based on a result of the comparing, a compensation frame using at least two of a first partial image corresponding to the first bearing information, the second predicted partial image, or the second partial image corresponding to the second bearing information; and transmitting the generated compensation frame to the electronic device based on the result of the comparing.

19 Claims, 18 Drawing Sheets

(51) Int. Cl.
*G06T 19/00* (2011.01)
*H04N 21/44* (2011.01)
*H04N 13/161* (2018.01)
*H04N 21/226* (2011.01)

(52) U.S. Cl.
CPC ......... *H04N 21/222* (2013.01); *H04N 21/226* (2013.01); *H04N 21/44008* (2013.01)

(58) Field of Classification Search
CPC ......... H04N 21/2393; H04N 21/42202; H04N 21/44008; H04N 21/44218; H04N 21/4728; H04N 21/6587; G06T 19/006
See application file for complete search history.

(56) References Cited

U.S. PATENT DOCUMENTS

| | | |
|---|---|---|
| 10,841,566 B2 | 11/2020 | He et al. |
| 10,880,346 B2 | 12/2020 | Adams et al. |
| 2009/0064242 A1 | 3/2009 | Cohen et al. |
| 2009/0222873 A1 | 9/2009 | Einarsson |
| 2015/0029219 A1 | 1/2015 | Watanabe |
| 2017/0078447 A1 | 3/2017 | Hancock et al. |
| 2017/0155912 A1 | 6/2017 | Thomas et al. |
| 2017/0244775 A1 | 8/2017 | Ha et al. |
| 2019/0064530 A1 | 2/2019 | Lee et al. |
| 2019/0253693 A1 | 8/2019 | Ha et al. |
| 2019/0347926 A1 | 11/2019 | Chokor et al. |
| 2021/0258555 A1* | 8/2021 | Leiby .................. H04N 13/344 |

FOREIGN PATENT DOCUMENTS

| | | |
|---|---|---|
| JP | 6192107 | 8/2018 |
| KR | 10-0613752 | 8/2006 |
| KR | 10-1720132 | 3/2017 |
| KR | 10-2019-0021229 | 3/2019 |
| KR | 10-2013403 | 8/2019 |
| KR | 10-2022421 | 9/2019 |

OTHER PUBLICATIONS

Xavier Corbillon, et al., "Optimal Set of 360-Degree Videos for Viewport-Adaptive Streaming", ACM, 2017, 9 pages.
Alireza Zare, et al., "HEVC-compliant Viewport-adaptive Streaming of Stereoscopic Panoramic Video", IEEE, 2016, 5 pages.

* cited by examiner

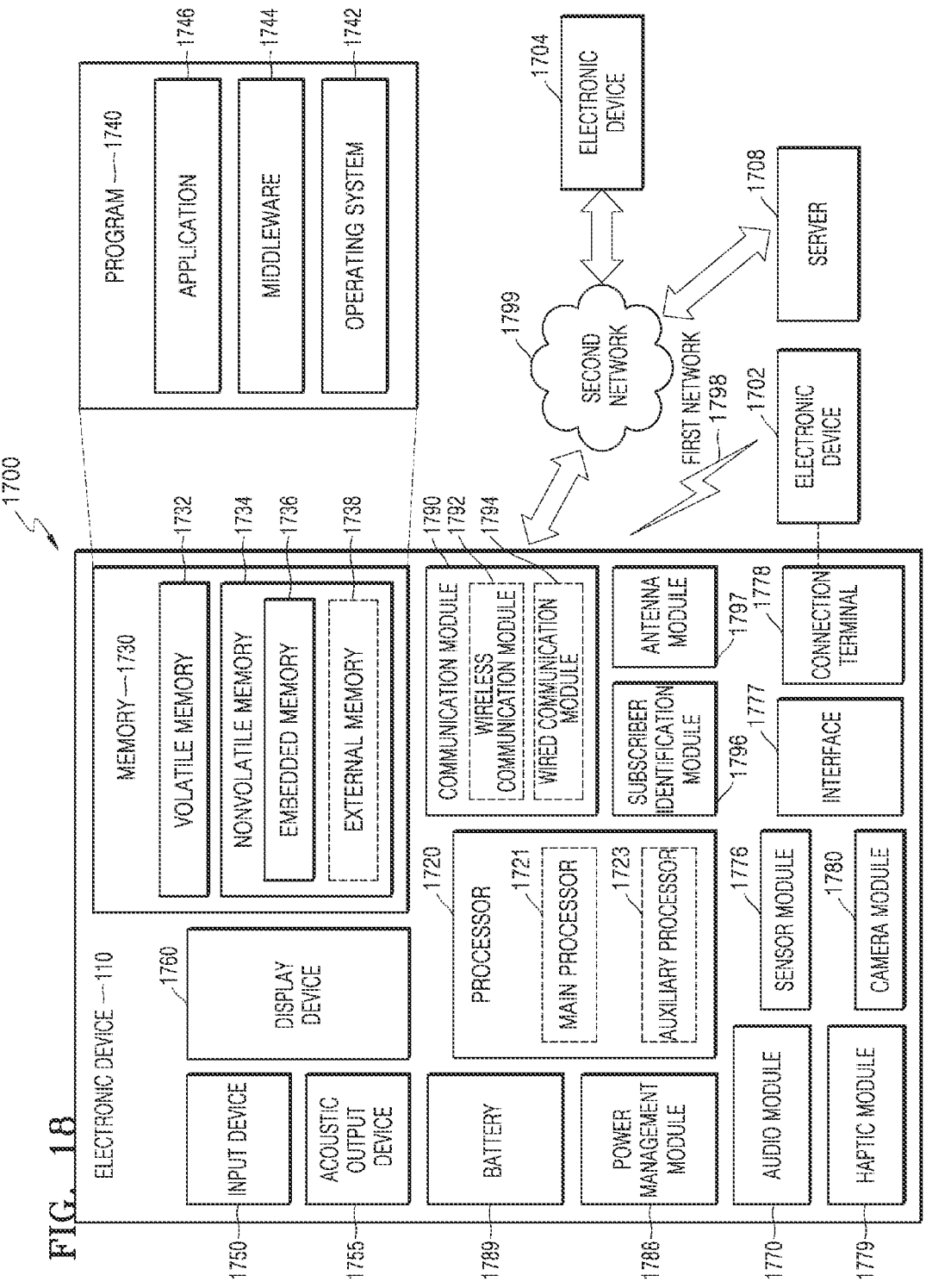

METHOD AND APPARATUS FOR TRANSMITTING VIDEO CONTENT USING EDGE COMPUTING SERVICE

CROSS-REFERENCE TO RELATED APPLICATION

This application is based on and claims priority under 35 U.S.C. § 119 to Korean Patent Application No. 10-2020-0022377, filed on Feb. 24, 2020, in the Korean Intellectual Property Office, the disclosure of which is incorporated by reference herein in its entirety.

BACKGROUND

1. Field

The disclosure relates to a method and an apparatus for transmitting video content using an edge computing service (e.g., a multi-access edge computing (MEC) service).

2. Description of Related Art

Recently, edge computing technology for transmitting data using an edge server has been discussed. Edge computing technology may include, for example, multi-access edge computing (MEC) or fog computing (FOC). Edge computing technology is a technology of providing data to an electronic device via a separate server (hereinafter, referred to as 'edge data network' or 'MEC server') provided at a location geographically close to the electronic device, for example, inside or around a base station. For example, an application requiring a low latency among at least one application installed in an electronic device may transmit and receive data via an edge server (edge data network or MEC server) provided at a geographically close location, without passing through a server located in an external data network (DN) (e.g., the Internet).

Recently, a service using edge computing technology (hereinafter, referred to as 'MEC-based service' or 'MEC service') has been discussed, and research and development of electronic devices to support the MEC-based service have been conducted. For example, an application of an electronic device may transmit and receive edge computing-based data to and from an edge server (or an application of the edge server) in an application layer.

Along with the progress of the research and development to support the MEC-based service, techniques for providing high-resolution video content to an electronic device using MEC have been discussed.

SUMMARY

Embodiments of the disclosure provide a method and an apparatus for transmitting video content using an edge computing service.

For example, embodiments of the disclosure provide a method, performed by an edge data network, of transmitting video content to an electronic device and the edge data network for providing video content to the electronic device.

Embodiments of the disclosure provide a method, performed by an electronic device, of receiving video content from an edge data network and the electronic device for receiving video content from the edge data network.

Additional aspects will be set forth in part in the description which follows and, in part, will be apparent from the description.

According to an example embodiment of the disclosure, a method, performed by an edge data network, of transmitting video content includes: obtaining first bearing information from an electronic device connected to the edge data network; determining second predicted bearing information based on the first bearing information; determining a second predicted partial image corresponding to the second predicted bearing information; transmitting, to the electronic device, a second predicted frame generated by encoding the second predicted partial image; obtaining, from the electronic device, second bearing information corresponding to a second partial image; comparing the second predicted bearing information to the obtained second bearing information; generating, based on a result of the comparing, a compensation frame using at least two of a first partial image corresponding to the first bearing information, the second predicted partial image, or the second partial image corresponding to the second bearing information; and transmitting the generated compensation frame to the electronic device based on the result of the comparing.

According to an example embodiment of the disclosure, an edge data network for transmitting video content to an electronic device includes: a network interface; a memory storing one or more instructions; and a processor configured to execute the one or more instructions, wherein the processor is further configured, by executing the one or more instructions, to obtain first bearing information from the electronic device connected to the edge data network, determine second predicted bearing information based on the first bearing information, determine a second predicted partial image corresponding to the second predicted bearing information, transmit, to the electronic device, a second predicted frame generated by encoding the second predicted partial image, obtain, from the electronic device, second bearing information corresponding to a second partial image, compare the second predicted bearing information to the obtained second bearing information, generate, based on a result of the comparing, a compensation frame using at least two of a first partial image corresponding to the first bearing information, the second predicted partial image, or the second partial image corresponding to the second bearing information, and transmit the generated compensation frame to the electronic device based on the result of the comparing.

According to an example embodiment of the disclosure, a method, performed by an electronic device, of providing video content received from an edge data network connected to the electronic device includes: transmitting first bearing information to the edge data network; obtaining, from the edge data network, a second predicted frame corresponding to second predicted bearing information determined based on the first bearing information; obtaining second bearing information of the second predicted frame; transmitting the obtained second bearing information to the edge data network; obtaining, from the edge data network, information about whether the second bearing information matches the second predicted bearing information; receiving a compensation frame from the edge data network or generating a compensation frame which refers to at least a portion of the second predicted frame, based on whether the second bearing information matches the second predicted bearing information; decoding the compensation frame received from the edge data network or the generated compensation frame based on whether the second bearing information matches the second predicted bearing information; and reproducing the decoded compensation frame.

According to an example embodiment of the disclosure, an electronic device for receiving video content from an edge data network includes: a network interface; a memory storing one or more instructions; and a processor configured to execute the one or more instructions, wherein the processor is further configured, by executing the one or more instructions, to transmit first bearing information to the edge data network, obtain, from the edge data network, a second predicted frame corresponding to second predicted bearing information determined based on the first bearing information, obtain second bearing information of the second predicted frame, transmit the obtained second bearing information to the edge data network, obtain, from the edge data network, information about whether the second bearing information matches the second predicted bearing information, receive a compensation frame from the edge data network or generate a compensation frame which refers to at least a portion of the second predicted frame, based on whether the second bearing information matches the second predicted bearing information, decode the compensation frame received from the edge data network or the generated compensation frame based on whether the second bearing information matches the second predicted bearing information, and reproduce the decoded compensation frame.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIG. 18 is a block diagram illustrating an example electronic device according to various embodiments.

DETAILED DESCRIPTION

Figure 1:
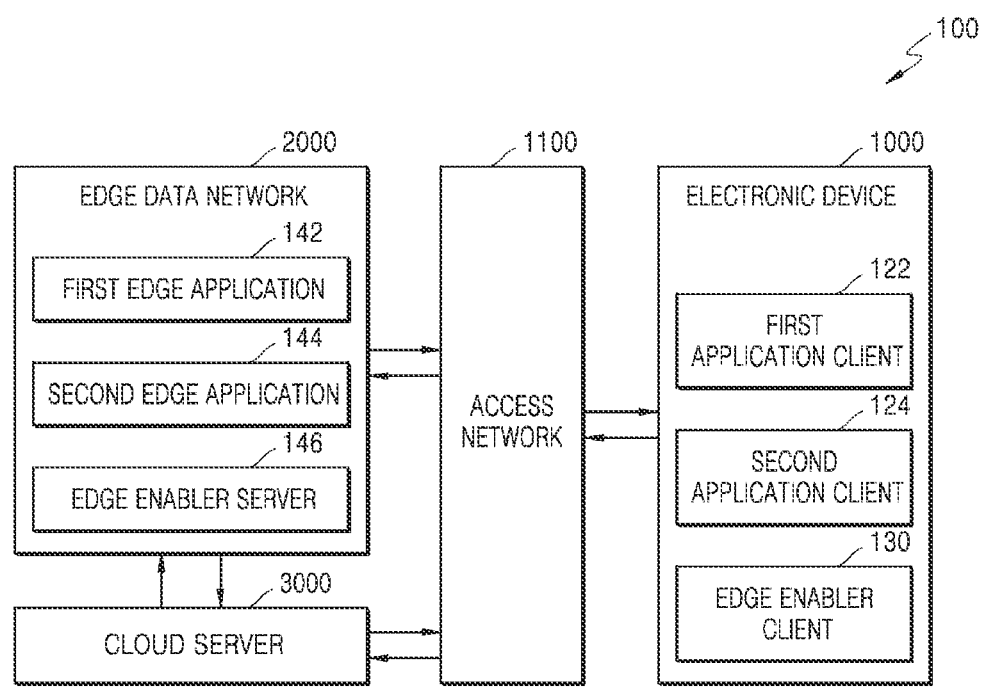
FIG. 1 is a diagram illustrating an example multi-access edge computing (MEC) technology in a network environment, according to various embodiments.

Hereinafter, various example embodiments of the disclosure will be described in greater detail with reference to the accompanying drawings In the description of embodiments, technical features that are well known to the technical field to which the disclosure belongs and are not directly associated with the disclosure may not be described. This is not to obscure but to clearly deliver the gist of the disclosure by omitting an unnecessary description.

Likewise, in the accompanying drawings, some components are exaggerated, omitted, or schematically shown. In addition, sizes of components may not fully reflect actual sizes thereof. Like reference numbers are used to refer to like elements throughout the drawings.

Advantages and features of the disclosure and a method for achieving them will be clear with reference to the accompanying drawings, in which example embodiments are shown. The disclosure may, however, be embodied in many different forms and should not be construed as being limited to the embodiments set forth herein; rather, these embodiments are provided so that this disclosure will be thorough and complete, and will fully convey the concept of the disclosure to those of ordinary skill in the art, and the disclosure will be defined only by the concept of the claims.

It could be understood that each block in processing flowchart drawings and combinations of flowchart drawings may be performed by computer program instructions. These computer program instructions may be loaded in a processor of a general-purpose computer, a particular-purpose computer, or other programmable data processing equipment, and thus, the instructions performed by a processor of a computer or other programmable data processing equipment generates a means configured to perform functions described in flowchart block(s). These computer program instructions may also be stored in a computer-usable or computer-readable memory capable of configuring a computer or other programmable data processing equipment to implement a function in a particular mode. Thus, the instructions stored in the computer-usable or computer-readable memory may also produce a production item involving an instruction means configured to perform a function described in flowchart block(s). These computer program instructions may also be loaded in a computer or other programmable data processing equipment, and thus, a computer-executable process may also be generated by performing a series of operation steps on the computer or the other programmable data processing equipment so that the instructions executed in the computer or the other programmable data processing equipment provide steps for executing functions described in flowchart block(s).

In addition, each block may indicate a portion of a module, a segment, or a code including one or more executable instructions for executing particular logical function(s). Also, in several alternate embodiments, functions described in blocks may also be out of a sequence. For example, two consecutively shown blocks may be substantially performed at the same time in fact, or the blocks may be sometimes performed in a reverse order according to a corresponding function.

The term ' . . . unit' used in the example embodiments refers to a component including software or hardware, such as a field programmable gate array (FPGA) or an application-specific integrated circuit (ASIC), and the ' . . . unit' performs certain roles. However, the ' . . . unit' is not limited to software or hardware. The ' . . . unit' may be configured to be included in an addressable storage medium or to reproduce one or more processors. Therefore, for example, the ' . . . unit' may include, for example, components, such as software components, object-oriented software components, class components, and task components, processes, functions, attributes, procedures, subroutines, segments of program code, drivers, firmware, microcode, circuits, data, a database, data structures, tables, arrays, and variables. A function provided inside components and ' . . . units' may be combined into a smaller number of components and ' . . . units' or be further divided into additional components and ' . . . units'. In addition, components and ' . . . units' may be implemented to reproduce one or more central processing units (CPUs) inside a device or a security multimedia card. In addition, in an embodiment, the ' . . . unit' may include one or more processors.

Throughout the disclosure, the expression "at least one of a, b or c" refers to only a, only b, only c, both a and b, both a and c, both b and c, all of a, b, and c, or variations thereof.

FIG. 1 is a diagram illustrating an example multi-access edge computing (MEC) technology in a network environment, according to various embodiments.

Referring to FIG. 1, a network environment 100 of the disclosure may include an electronic device 1000, an edge data network 2000, a cloud server 3000, and an access network (AN) 1100. However, the components included in the network environment 100 are not limited to the components illustrated in FIG. 1.

According to various embodiments, each of the components included in the network environment 100 may be a physical entity unit, or a software or module unit capable of performing an individual function.

According to various embodiments, the electronic device 1000 may be a device used by a user. For example, the electronic device 1000 may be a terminal, a user equipment (UE), a mobile station, a subscriber station, a remote terminal, a wireless terminal, or a user device.

In addition, the electronic device 1000 may be a terminal for providing content for immersing a user in a virtual environment including at least one of virtual reality (VR), augmented reality (AR), or mixed reality (MR). That is, according to various embodiments, the electronic device 1000 may be a head mounted display (HMD) or a virtual reality headset (VRH) for providing content for VR, AR, or MR.

Referring to FIG. 1, the electronic device 1000 may include a first application client (or an application client) 122, a second application client 124, and an edge enabler client (or an MEC enabling layer (MEL)) 130. The electronic device 1000 may perform an operation using the edge enabler client 130, to use an MEC service. A detailed description of the edge enabler client 130 is presented below.

According to various embodiments, the electronic device 1000 may execute a plurality of applications. For example, the electronic device 1000 may execute the first application client 122 and the second application client 124. The plurality of applications may require different network services based on, for example, at least one of a required data transmission rate, a latency (or a speed), reliability, the number of electronic devices accessing a network, a network access period of the electronic device 1000, or an average data use amount. The different network services may include, for example, an enhanced mobile broadband (eMBB) service, an ultra-reliable and low latency communication (URLLC) service, or a massive machine type communication (mMTC) service.

An application client of the electronic device 1000 may refer, for example, to a default application previously installed in the electronic device 1000 or an application provided by a third party. That is, an application client of the electronic device 1000 may refer to a client application program running in the electronic device 1000 for a particular application service. Several application clients may run in the electronic device 1000. At least one of the application clients may use a service provided from the edge data network 2000. For example, an application client is an application installed and executed in the electronic device 1000 and may provide a function of transmitting and receiving data via the edge data network 2000. An application client in the electronic device 1000 may refer, for example, to application software executed in the electronic device 1000 to use a function provided by one or more particular edge applications.

According to various embodiments, the plurality of applications, e.g., the first and second application clients 122 and 124, in the electronic device 1000 may perform data transmission and reception with the cloud server 3000 based on a required network service type or perform data transmission and reception with the edge data network 2000 based on edge computing. For example, when the first application client 122 does not require a low latency, the first application client 122 may perform data transmission and reception with the cloud server 3000. As another example, when the second application client 124 requires a low latency, the second application client 124 may perform MEC-based data transmission and reception with the edge data network 2000.

According to various embodiments, an application in the electronic device 1000 may be referred to as an application client, a client application (Client App), or a UE application (UE App). For convenience, hereinafter, in the disclosure, an application in the electronic device 1000 is referred to as an application client.

According to various embodiments, the AN 1100 may provide a channel for wireless communication with the electronic device 1000. For example, the AN 1100 may indicate a radio access network (RAN), a base station, an evolved node B (eNodeB or eNB), a fifth-generation (5G) node, a transmission/reception point (TRP), or a fifth-generation NodeB (5GNB).

According to various embodiments, the edge data network 2000 may refer, for example, to a server which the electronic device 1000 accesses to use an MEC service. The edge data network 2000 may be provided at a location geographically close to the electronic device 1000, e.g., inside or around a base station. According to various embodiments, the edge data network 2000 may transmit and receive data to and from the electronic device 1000 without passing through an external data network (DN) (e.g., the Internet). According to various embodiments, MEC may refer to multi-access edge computing or mobile-edge computing.

According to various embodiments, the edge data network 2000 may be referred to as an MEC host, an edge computing server, a mobile edge host, an edge computing platform, an MEC server, or the like. For convenience, hereinafter, in the disclosure, the edge data network 2000 refers to an MEC server. Referring to FIG. 1, the edge data network 2000 may include a first edge application 142, a second edge application 144, and an edge enabler server (or an MEC platform (MEP)) 146. The edge enabler server 146 provides an MEC service, performs traffic control, or the like in the edge data network 2000, and detailed descriptions of the edge enabler server 146 will be provided below.

According to various embodiments, the edge data network 2000 may execute a plurality of applications. For example, the edge data network 2000 may execute the first edge application 142 and the second edge application 144. According to various embodiments, an edge application may refer, for example, to an application provided by a third party in an edge data network which provides an MEC service. An edge application may be used to establish a data session with an application client in order to transmit and receive data associated with the application client. That is, an edge application may establish a data session with an application client. According to various embodiments, a data session may indicate a communication path established for an application client in the electronic device 1000 and an edge application in the edge data network 2000 to transmit and receive data to and from each other.

According to various embodiments, an application in the edge data network 2000 may be referred to as an MEC application (MEC App), an ME (MEC) App, an edge application server, or an edge application. For convenience, hereinafter, in the disclosure, an application in the edge data network 2000 is referred to as an edge application. Herein, although the term 'application' is used, the edge application may refer, for example, to an application server existing in the edge data network 2000.

According to various embodiments, the cloud server 3000 may provide content associated with an application. For example, the cloud server 3000 may be managed by a content provider. According to various embodiments, the cloud server 3000 may transmit and receive data to and from the electronic device 1000 via an external DN (e.g., the Internet).

Although not shown in FIG. 1, a core network (CN) and a DN may exist between the AN 1100 and the edge data network 2000. According to various embodiments, the DN may provide a service (e.g., an Internet service or an internet protocol multimedia subsystem (IMS) service) to the electronic device 1000 by transmitting and receiving data (or a data packet) to and from the electronic device 1000 via the CN and the AN 1100. For example, the DN may be managed by a network operator. According to various embodiments, the edge data network 2000 may be connected to the AN 1100 or the CN via the DN (e.g., a local DN).

According to various embodiments, when the first application client 122 or the second application client 124 is executed in the electronic device 1000, the electronic device 1000 may access the edge data network 2000 via the AN 1100 to transmit and receive data for executing an application client.

In the example embodiments, a method of streaming video content among the electronic device 1000, the edge data network 2000, and the cloud server 3000 may be provided. In more detail, a method of effectively providing content for VR, AR, or MR to a user based on the user's interaction information on a video reproduced by the electronic device 1000 is described. Hereinafter, FIG. 2 shows an example method, performed by the edge data network 2000, of streaming video content based on bearing information of the video content reproduced by the electronic device 1000.

Figure 2:
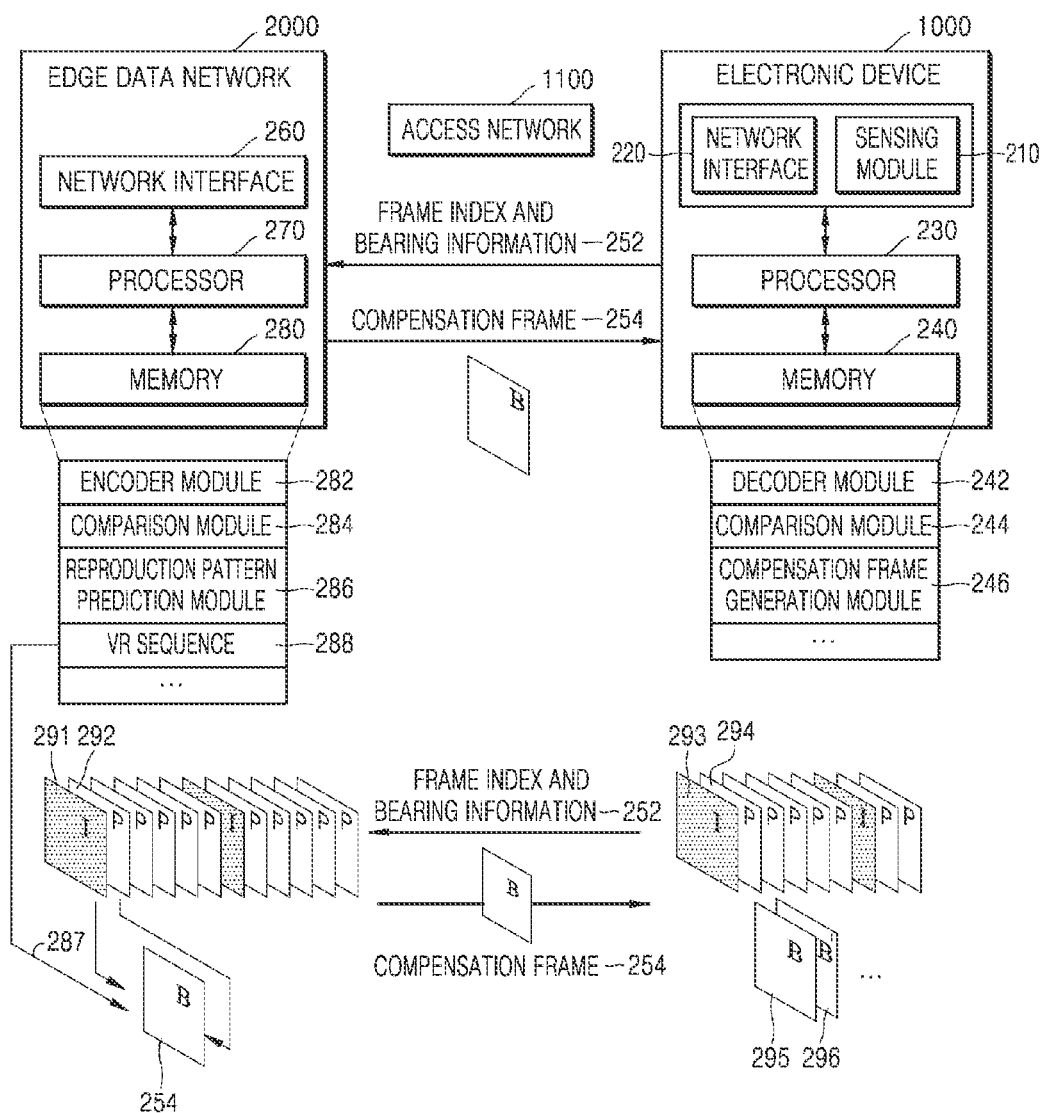
FIG. 2 is a diagram illustrating an example operation between an electronic device and an edge data network, according to various embodiments.

FIG. 2 is a diagram illustrating an example operation between the electronic device 1000 and the edge data network 2000, according to various embodiments.

According to various embodiments, the electronic device 1000 may include a sensing module 210, a network interface 220, a processor 230, and a memory 240. However, components in the electronic device 1000 are not limited to the components illustrated in FIG. 2, and the electronic device 1000 may include a greater or fewer number of components.

The electronic device 1000 may decode images received from the edge data network 2000 or a cloud server and display the decoded images on a display of the electronic device 1000. In addition, the electronic device 1000 may obtain bearing information of the reproduced images using the sensing module 210. As described below with reference to FIG. 4, bearing information may include angle values of a gaze of a user of the electronic device 1000, which is measured using the sensing module 210.

The electronic device 1000 may transmit information 252 about the bearing information and a frame index of a partial image being currently reproduced to the edge data network 2000 using the network interface 220. The frame index may, for example, be information indicating an encoding/decoding order of a frame but is not limited thereto, and the frame index may be information indicating a rendering order of the frame.

The processor 230 controls a general operation of the electronic device 1000 by executing one or more instructions in the memory 240. For example, the processor 230 may control the sensing module 210 and the network interface 220 by executing the one or more instructions stored in the memory 240. According to various embodiments, the processor 230 may receive an intra-coded frame (I frame) or a predictive-coded frame (P frame) from the edge data network 2000 as a predicted frame related to a second predicted partial image determined based on first bearing information of a first partial image reproduced by the electronic device 1000.

In addition, according to various embodiments, the processor 230 may decode the I frame or the P frame related to the second predicted partial image. The processor 230 may obtain second bearing information corresponding to a second partial image before or while reproducing the second predicted partial image.

In addition, the processor 230 may receive, from the edge data network 2000, information about a comparison result between the second predicted partial image determined based on the first bearing information and the second partial image corresponding to the second bearing information. According to another example embodiment, the processor 230 may receive, from the edge data network 2000, information about whether second predicted bearing information corresponding to the second predicted partial image matches the second bearing information corresponding to the second partial image.

In addition, based on the information about whether the second predicted bearing information matches the second bearing information, the processor 230 may receive a compensation frame 254 or 295 corresponding to the second partial image, which refers to at least a portion of I frames or P frames related to the first partial image and the second predicted partial image, from the edge data network 2000 or generate a compensation frame 296 which refers to an I frame (not shown) or a P frame 294 related to the received second predicted partial image. For example, an operation, performed by the processor 230, of processing the compensation frame 254 received from the edge data network 2000 when the edge data network 2000 determines that the second predicted partial image does not match the second partial image (or based on determining that the second predicted bearing information does not match the second bearing information) will be described in detail with reference to FIG. 4.

In addition, the processor 230 may decode the compensation frame 254 received from the edge data network 2000 or the generated compensation frame 296, based on the information about whether the second predicted bearing information matches the second bearing information, and reproduce the decoded compensation frame.

In addition, according to various embodiments, the memory 240 may include a decoder module 242, a comparison module 244, and a compensation frame generation module 246. The decoder module 242 is configured to store instructions for decoding encoded frames received from the edge data network 2000. The comparison module 244 is configured to determine whether a decoded image received from the edge data network 2000 matches an image which the user of the electronic device 1000 actually views or compare predicted bearing information of a predicted frame previously predicted by the edge data network 2000 and transmitted to the electronic device 1000 to bearing information obtained based on an actual input of the user of the electronic device 1000. The compensation frame generation module 246 is configured to store instructions for executing, in a computer, a method of generating a compensation frame using, for example, only a predicted partial image previously stored in a buffer of the electronic device 1000 when predicted bearing information of a predicted frame, which is received from the edge data network 2000, matches bearing information that is information about an angle value at which the user of the electronic device 1000 actually views, but is not limited thereto.

According to various embodiments, the edge data network 2000 may include a network interface 260, a processor 270, and a memory 280. However, components of the edge data network 2000 are not limited to the components illustrated in FIG. 2, and the edge data network 2000 may include a greater number of components, or some components may be omitted therefrom.

The edge data network 2000 may obtain a frame index and bearing information from the electronic device 1000 using the network interface 260 and transmit a compensation frame 254 generated in the edge data network 2000 to the electronic device 1000.

The processor 270 controls a general operation of the edge data network 2000 by executing one or more instructions in the memory 280. For example, the processor 270 may determine second predicted bearing information based on first bearing information obtained from the electronic device 1000 and determine a second predicted partial image based on the determined second predicted bearing information.

The processor 270 generates a compensation frame 254 which refers to at least one portion of an I frame 291, a P frame 292, or a frame 287 in the VR sequence 288. For example, the processor 270 generates the compensation frame 232 corresponding to a second partial image based on a first partial image (for example, at least portion of the I frame 291 or at least portion of the P frame 293) corresponding to first bearing information, a second predicted partial image (at least portion of I frame 291 or at least portion of P frame 293), and the second partial image (for example, at least portion of the frame 287) corresponding to second bearing information based on determining that the second predicted bearing information does not match the second bearing information. The compensation frame 232 may be transmitted to the electronic device 1000.

The processor 270 generates the compensation frame 232 corresponding to the second partial image based on the second predicted partial image (at least portion of I frame 291 or at least portion of P frame 293), and the second partial image (for example, at least portion of the frame 287) corresponding to the second bearing information based on determining that the second predicted bearing information matches the second bearing information. The compensation frame 232 may be discarded.

In addition, according to various embodiments, the memory 280 may include an encoder module 282, a comparison module 284, a reproduction pattern prediction module 286, and a VR sequence 288. The encoder module 282 is configured to store instructions for encoding images to be transmitted from the edge data network 2000 to the electronic device 1000. The comparison module 284 is configured to store instructions for determining whether predicted bearing information predicted by the edge data network 2000 matches bearing information including an angle value at which the user of the electronic device 1000 actually views. The reproduction pattern prediction module 286 is configured to predict an image reproduction pattern of the electronic device 1000 based on the bearing information that is information about the angle value at which the user of the electronic device 1000 actually views. The VR sequence 288 includes all image data of a VR sequence to be described below, but is not limited thereto.

Figure 3:
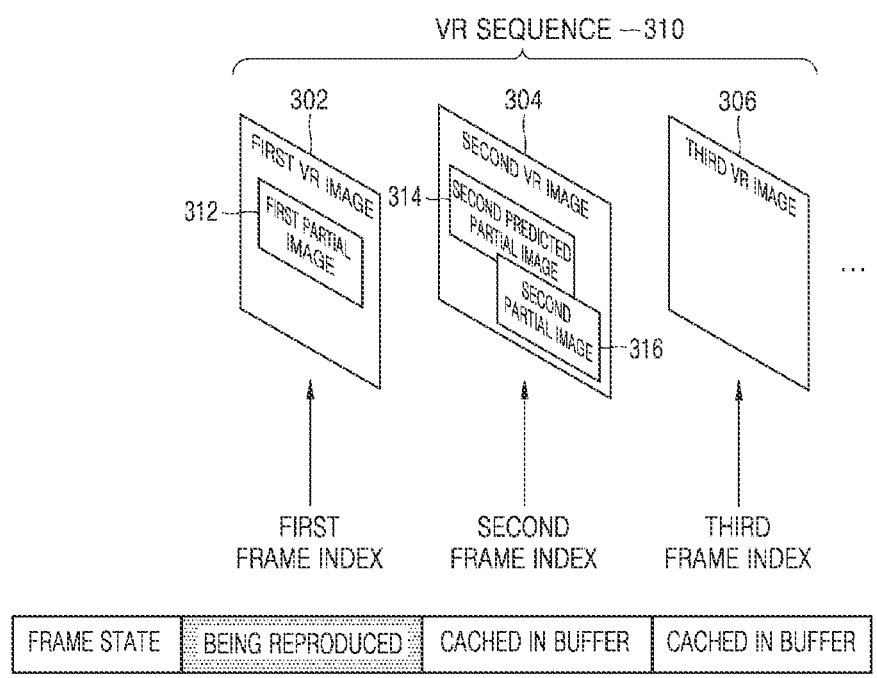
FIG. 3 is a diagram illustrating an example relationship between partial images to be transmitted between an electronic device and an edge data network, according to various embodiments.

FIG. 3 is a diagram illustrating an example relationship between partial images to be transmitted between an electronic device and an edge data network, according to various embodiments.

According to various embodiments, the edge data network 2000 may not transmit an entire VR image for VR to the electronic device 1000, but transmit only a partial image in the VR image, which corresponds to bearing information obtained from the electronic device 1000, to effectively provide video content to the user of the electronic device 1000. For example, the edge data network 2000 may not transmit frames of a first VR image 302 and a second VR image 304 to the electronic device 1000, but transmit only frames of a first partial image 312, a second predicted partial image 314, and a second partial image 316 to the electronic device 1000 to effectively transmit video content to the electronic device 1000.

According to various embodiments, the first partial image 312, the second predicted partial image 314, and the second partial image 316 shown in FIG. 3 may be partial images for frames (e.g., frames 302, 304, and/or 306) in a VR sequence 310 including a plurality of frames. For example, the first partial image 312 may have the same frame index as the first VR image 302 including the first partial image 312, and the second predicted partial image 314 and the second partial image 316 may have the same frame index as the second VR image 304 including the second predicted partial image 314 and the second partial image 316.

In addition, according to various embodiments, the VR sequence 310 may be, as all or some of VR images, a set of all or some of consecutive frames among a plurality of frames included in the VR images. For example, the VR sequence 310 may include the first VR image 302 having a first frame index, the second VR image 304 having a second frame index, and a third VR image 306 having a third frame index. Herein, a frame corresponding to the first frame index, a frame corresponding to the second frame index, and a frame corresponding to the third frame index may be consecutive frames, but are not limited thereto, and another frame may be included therebetween.

In addition, each of the first partial image 312, the second predicted partial image 314, and the second partial image 316 may include bearing information including an angle value of a gaze of the user of the electronic device 1000 to view a certain partial image in a VR image. For example, the first partial image 312 may include first bearing information, and a location of the first partial image 312 in the first VR image 302 may be determined based on the first bearing information. In addition, the second predicted partial image 314 may include second predicted bearing information and a location of the second predicted partial image 314 in the second VR image 304 may be determined based on the second predicted bearing information. The second partial image 316 may include second bearing information, and a location of the second partial image 316 in the second VR image 304 may be determined based on the second bearing information.

That is, bearing information may indicate a location of each partial image in a VR image, and the location of each partial image in the VR image may be determined based on the bearing information. In addition, according to various embodiments, a range of a partial image in a VR image, which may be identified based on bearing information, may depend on a display area in a display device (e.g., a size of a viewport region) which the user of the electronic device 1000 may view.

In addition, according to various embodiments, the electronic device 1000 may sense bearing information (e.g., roll, pitch, and/or yaw values) of the user's eye which gazes at a particular partial image in a VR image, using a sensor (e.g., a three-axial slope sensor), and match the sensed bearing information with a partial image corresponding to the bearing information. The electronic device 1000 may share, with the edge data network 2000, information about at which portion in a VR image the user of the electronic device 1000 currently looks, by transmitting the sensed bearing information to the edge data network 2000.

According to various embodiments, hereinafter, a description will be made below with reference to FIGS. 4 and 5 under the assumption that the first partial image 312 is a partial image of the first VR image 302 having the first frame index in the VR sequence 310, and the second predicted partial image 314 and the second partial image 316 are partial images of the second VR image 304 having the second frame index in the VR sequence 310.

Figure 4:
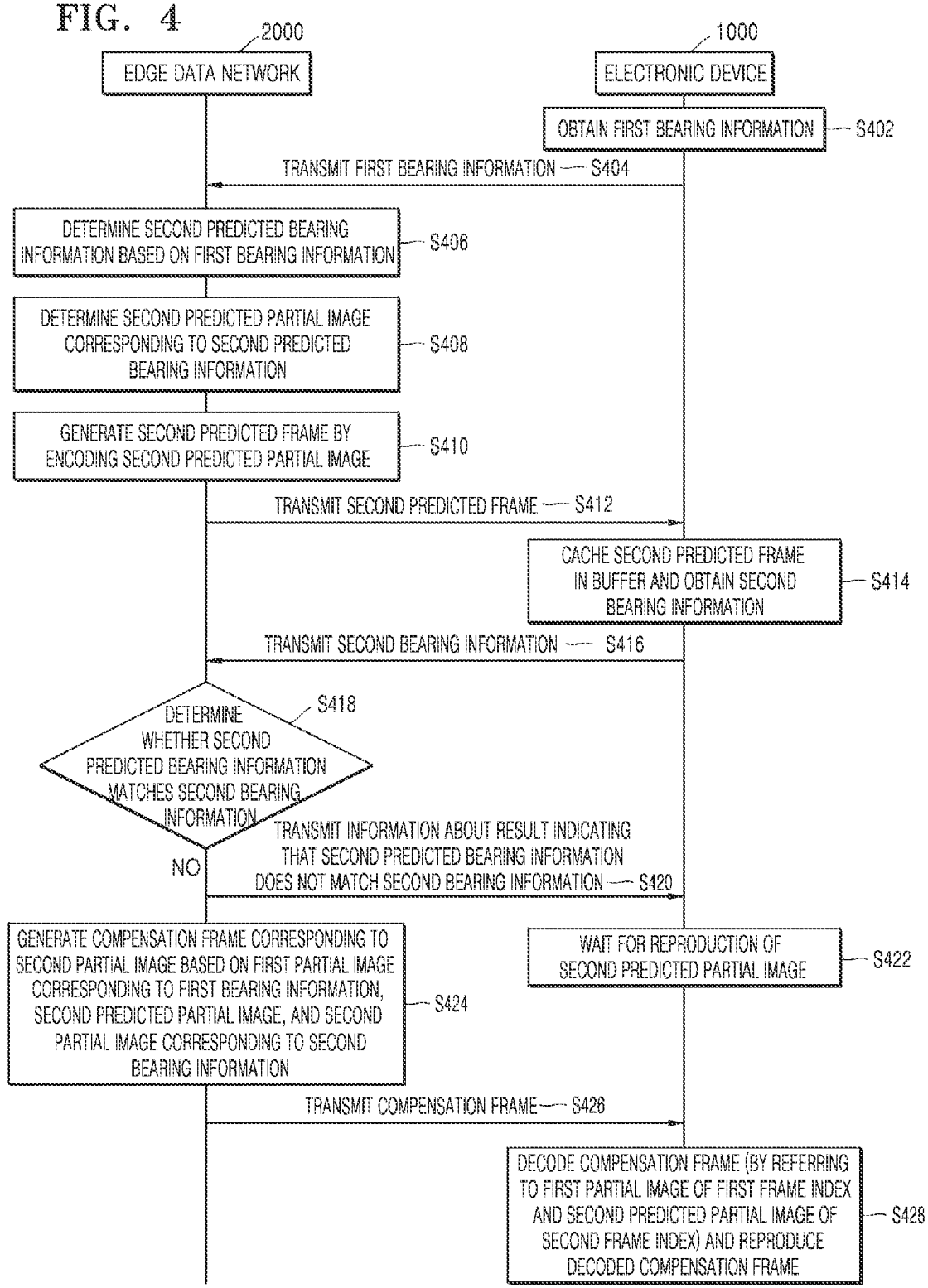
FIG. 4 is a sequence diagram illustrating an example operation between an electronic device and an edge data network, according to various embodiments.

FIG. 4 is a diagram illustrating an example operation between the electronic device 1000 and the edge data network 2000, according to various embodiments.

In operation S402, the electronic device 1000 may obtain first bearing information using the sensing module 210 in the electronic device. According to various embodiments, the first bearing information may include, for example, only information indicating a location of the first partial image 312 in the first VR image 302, the first partial image 312 being reproduced by the electronic device 1000. However, according to various embodiments, the first bearing information may include a plurality of pieces of bearing information of partial images reproduced until the first partial image 312 is reproduced by the electronic device 1000. In operation S404, the electronic device 1000 may transmit the first bearing information to the edge data network 2000.

In operation S406, the edge data network 2000 may determine second predicted bearing information based on the first bearing information. For example, the edge data network 2000 may determine the second predicted bearing information based on the first bearing information obtained from the electronic device 1000 so that the second predicted bearing information is identical to the first bearing information, or determine the second predicted bearing information based on variations among the plurality of pieces of bearing information included in the first bearing information. A method, performed by the edge data network 2000, of determining the second predicted bearing information will be described in detail with reference to FIGS. 10, 11, 12, and 13.

In operation S408, the edge data network 2000 may determine the second predicted partial image 314 corresponding to the second predicted bearing information. The second predicted partial image 314 refers, for example, to a partial image predicted by the edge data network 2000 for the user of the electronic device 1000 to view, and the second partial image 316 to be described below refers, for example, to a partial image corresponding to a location (e.g., second bearing information) of a partial image which the user actually views, the location being obtained from the electronic device 1000.

In operation S410, the edge data network 2000 may generate a second predicted frame by encoding the determined second predicted partial image 314. For example, the edge data network 2000 may generate an I or P frame by encoding the second predicted partial image 314. The I frame and the P frame described above and a bidirectional-coded frame (B frame) to be described below may be data frames used to compress an image according to a lossy compression algorithm developed in a Moving Picture Experts Group (MPEG) of the International Organization for Standardization. In addition, the B frame may indicate a data frame for compressing an image at a high compression ratio by referring to at least one of the P frame or the I frame.

In operation S412, the edge data network 2000 may transmit the generated second predicted frame to the electronic device 1000. According to various embodiments, the edge data network 2000 may transmit the second predicted frame to the electronic device 1000 and also separately store, in a database (DB) of the edge data network 2000, the second predicted frame transmitted to the electronic device 1000. In operation S414, the electronic device 1000 may cache the second predicted frame obtained from the edge data network 2000 in a buffer of the electronic device 1000 and obtain second bearing information by using the sensing module 210 in the electronic device 1000.

In more detail, the electronic device 1000 may obtain the second bearing information using the sensing module 210 in the electronic device 1000 at (a time point before a preset time from) a time point when the electronic device 1000 reproduces the second predicted partial image 314, (a time point before a preset time from) a time point when a preset time elapses from a time point when the first partial image 312 was reproduced, or a time point before a preset time from a time point when the second predicted partial image 314 is predicted to be reproduced. In operation S416, the electronic device 1000 may transmit the obtained second bearing information to the edge data network 2000.

For example, instead of decoding the second predicted frame and immediately reproducing the second predicted partial image 314 using the decoded second predicted frame, the electronic device 1000 may obtain, as the second bearing information, information about a location of a partial image which the user views in the second VR image 304 and transmit the obtained second bearing information to the edge data network 2000 to check whether the second predicted partial image 314 according to the second predicted bearing information currently cached in the buffer of the electronic device 1000 matches the partial image which the user is currently going to view in the second VR image 304.

In operation S418, the edge data network 2000 may determine whether the second predicted bearing information determined in operation S406 matches the second bearing information obtained from the electronic device 1000. For example, the edge data network 2000 may determine that the second predicted bearing information does not match the second bearing information, when an average of difference values of angular components (e.g., pitch, roll, and/or yaw) in the second bearing information and the second predicted bearing information is greater than or equal to a preset threshold angle.

In addition, according to various embodiments, the edge data network 2000 may compare the second predicted bearing information to the second bearing information or compare the second predicted partial image 314 corresponding to the second predicted bearing information to the second partial image 316 corresponding to the second bearing information. For example, the edge data network 2000 may store the VR sequence 310 including all frames in the DB in the edge data network 2000. The edge data network 2000 may identify the second partial image 316 in the VR sequence 310 stored in the DB using the second bearing information obtained from the electronic device 1000. The edge data network 2000 may compare pixel values of the identified second partial image 316 to pixel values of the second predicted partial image 314 corresponding to the second predicted bearing information and determine that the second partial image 316 matches the second predicted partial image 314 when the number of pixels of which a pixel value difference is greater than or equal to a preset threshold value is greater than or equal to a predetermined threshold value.

In operation S420, the edge data network 2000 may transmit, to the electronic device 1000, information about a comparison result indicating that the second predicted bearing information does not match the second bearing information. In operation S422, the electronic device 1000 may wait for reproduction of the second predicted partial image 314 based on the information about the comparison result indicating that the second predicted bearing information does not match the second bearing information, the information being received from the edge data network 2000.

In operation S424, the edge data network 2000 may generate a compensation frame corresponding to the second partial image 316 based on the first partial image 312, the second predicted partial image 314, and the second partial image 316 based on determining that the second predicted bearing information does not match the second bearing information.

In more detail, based on determining that the second predicted bearing information does not match the second bearing information, the edge data network 2000 may access the VR sequence 310 stored in the DB using the second bearing information obtained from the electronic device 1000, thereby obtaining the second partial image 316 corresponding to the second bearing information in the VR sequence 310.

According to various embodiments, referring to FIG. 3, because the first partial image 312 is currently being reproduced by the electronic device 1000, a first frame generated by encoding the first partial image 312 and the second predicted frame transmitted to the electronic device 1000 in operation S412 may be already stored in the DB of the edge data network 2000. The edge data network 2000 may generate the compensation frame corresponding to the second partial image 316 so as to refer to at least a portion of the first frame and the second predicted frame transmitted to the electronic device 1000 in operation S412.

Particularly, the edge data network 2000 may determine, as first difference information, information about a difference between image information in the first frame corresponding to the first partial image 312 and image information in a second frame corresponding to the second partial image 316; determine, as second difference information, information about a difference between image information in the second predicted frame corresponding to the second predicted partial image 314 and the image information in the second frame; and generate the compensation frame corresponding to the second partial image 316 using the first difference information and the second difference information.

According to various embodiments, the first difference information may include first reference block information indicating a block address (or location) in the first frame and a block address (or location) in the second frame, which is used to determine the first difference information, and information about a pixel difference between a block in the first frame and a block in the second frame, which is used to determine the first difference information. For example, the first reference block information may include motion vector information. The motion vector information (that is, displacement information) may indicate a difference between the block location in the first frame and the block location in the second frame.

In addition, according to various embodiments, the second difference information may include second reference block information indicating a block address (or location) in the second frame and a block address (or location) in the second predicted frame, which is used to determine the second difference information, and information about a pixel difference between a block in the second frame and a block in the second predicted frame, which is used to determine the second difference information.

According to various embodiments, the edge data network 2000 may sequentially obtain, from an encoder, a P frame corresponding to the first partial image 312, the compensation frame corresponding to the second partial image 316, and a P frame corresponding to the second predicted partial image 314 by inputting images to the encoder in the order of the first partial image 312, the second partial image 316, and the second predicted partial image 314, but an encoding sequence of the encoder is not limited thereto. That is, the encoder in the edge data network 2000 may encode the first partial image 312 to the first frame, encode the second predicted partial image 314 to the second predicted frame, and then encode the second partial image 316 so as to refer to at least a portion of the encoded first frame and at least a portion of the encoded second predicted frame.

In operation S426, the edge data network 2000 may transmit the compensation frame generated in operation S424 to the electronic device 1000. In operation S428, the electronic device 1000 may decode the compensation frame obtained from the edge data network 2000 and reproduce the decoded compensation frame. For example, the electronic device 1000 may obtain the first reference block information and the second reference block information in the compensation frame and decode the compensation frame by referring to some blocks in the first frame corresponding to the first reference block information and some blocks in the second predicted frame corresponding to the second reference block information. The electronic device 1000 may decode the compensation frame and deliver the decoded compensation frame to the display of the electronic device 1000 so that the second partial image 316 is provided to the user of the electronic device 1000.

Figure 5:
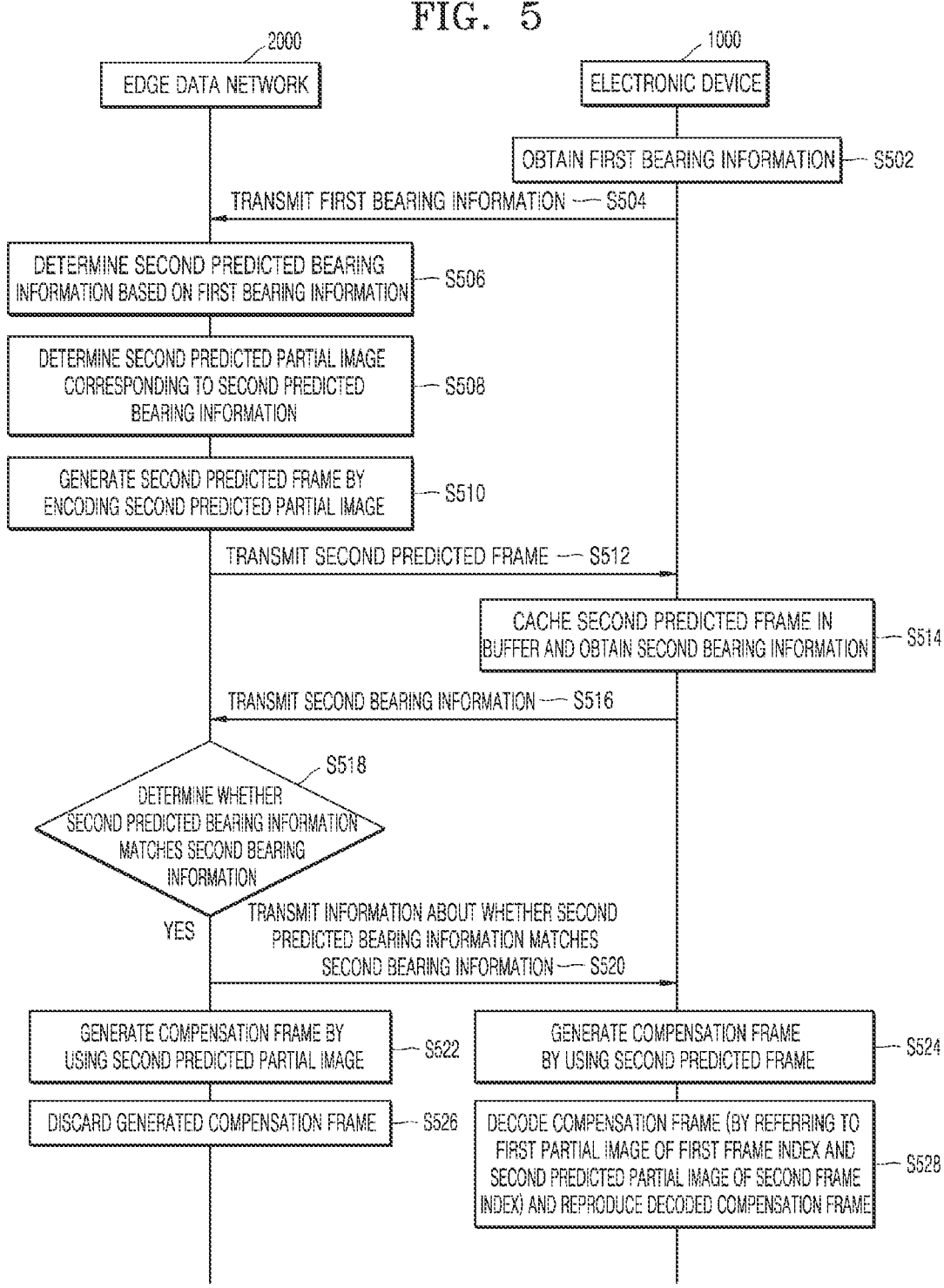
FIG. 5 is a sequence diagram illustrating an example operation between an electronic device and an edge data network, according to various embodiments.

FIG. 5 is a sequence diagram illustrating an example operation between the electronic device 1000 and the edge data network 2000, according to various embodiments.

An example operation procedure between the electronic device 1000 and the edge data network 2000 when the second predicted bearing information does not match the second bearing information has been described above with reference to FIG. 4, and an example operation procedure between the electronic device 1000 and the edge data network 2000 when the second predicted bearing information matches the second bearing information will now be described with reference to FIG. 5. Operations S502 to S516 of FIG. 5 may correspond to operations S402 to S416 of FIG. 4, and thus, detailed descriptions thereof are not repeated here.

In operation S518, the edge data network 2000 may determine whether the second predicted bearing information determined in operation S506 matches the second bearing information obtained from the electronic device 1000. For example, the edge data network 2000 may determine that the second predicted bearing information matches the second bearing information, when an average of difference values of angular components (e.g., pitch, roll, and/or yaw) in the second bearing information and the second predicted bearing information is less than the preset threshold angle.

In operation S520, the edge data network 2000 may transmit, to the electronic device 1000, information about a comparison result indicating that the second predicted bearing information matches the second bearing information. In operation S522, the edge data network 2000 may generate a compensation frame by encoding the second predicted partial image 314 stored in the DB based on determining that the second predicted bearing information matches the second bearing information.

In more detail, based on determining that the second predicted bearing information matches the second bearing information, the edge data network 2000 may determine that the second predicted partial image 314 is identical to the second partial image 316, and generate a compensation frame which refers to at least some blocks in the second predicted frame. In operation S524, the electronic device 1000 may generate a compensation frame having the same image information as image information of the second predicted frame received in operation S512, based on the comparison result indicating that the second predicted bearing information matches the second bearing information. The electronic device 1000 may reproduce an image by, for example, using only the compensation frame obtained from the edge data network 2000 and the compensation frame generated by the electronic device 1000, as described below with reference to FIG. 16, to efficiently provide video content to the user without affecting a decoding order of an I or P frame cached in the buffer of the electronic device 1000. Therefore, the electronic device 1000 may generate the compensation frame having the same image information as that of the second predicted frame even when the comparison result indicating that the second predicted bearing information matches the second bearing information is received.

In more detail, the edge data network 2000 may generate a compensation frame using difference information of a difference between the image information in the second predicted frame and the image information in the second frame, and because it has been determined that the second predicted bearing information matches the second bearing information, a difference value between the image information in the second predicted frame and the image information in the second frame is determined as 0, and as a result, the second predicted frame and the compensation frame may have the same image information. In addition, as described above with reference to FIG. 4, the difference information of the difference between the image information in the second predicted frame and the image information in the second frame further includes reference block information indicating a block address (or location) in the second predicted frame and a block address (or location) in the second frame, which is used to determine the difference information, in addition to information about a pixel difference between a block in the second predicted frame and a block in the second frame.

In operation S526, the edge data network 2000 may discard the generated compensation frame. For example, because it has been determined that the second predicted partial image 314 matches the second partial image 316, the edge data network 2000 does not have to transmit separate frames, and thus, the edge data network 2000 may discard the generated compensation frame without transmitting the generated compensation frame to the electronic device 1000.

According to various embodiments, when the second predicted bearing information matches the second bearing information, the edge data network 2000 does not have to generate a separate compensation frame and transmit the generated compensation frame to the electronic device 1000, and thus, the edge data network 2000 may not generate a separate compensation frame, unlike operation S522. However, according to another example embodiment, even when it is determined that the second predicted bearing information matches the second bearing information, the edge data network 2000 may generate a compensation frame which refers to the second predicted frame, thereby being synchronized with a frame decoding operation of the electronic device 1000. In operation S528, the electronic device 1000 may decode the compensation frame generated in operation S524 and reproduce the decoded compensation frame. For example, the electronic device 1000 may obtain the reference block information in the compensation frame and decode the compensation frame by referring to some blocks in the second predicted frame and some blocks in the first frame based on the obtained reference block information. At present, the second predicted frame includes the same image information as the compensation frame, and thus, the electronic device 1000 may decode the compensation frame by referring to only the second predicted frame. The electronic device 1000 may decode the compensation frame generated in operation S524 and deliver the decoded compensation frame to the display of the electronic device 1000 so that the second predicted partial image 314 is provided to the user of the electronic device 1000.

As described, to efficiently provide video content to the user without affecting a decoding order of an I or P frame cached in the buffer of the electronic device 1000, even when a comparison result indicating that second predicted bearing information matches second bearing information is received, a compensation frame including the same image information as image information of a second predicted frame is generated, but the various embodiments are not limited thereto, and the electronic device 1000 may not separately generate a compensation frame in operation S524. In this case, the electronic device 1000 may decode the second predicted frame cached in operation S514 and deliver the decoded second predicted frame (the second predicted partial image 314) to the display of the electronic device 1000 so that the second predicted partial image 314 is reproduced (is provided to the user of the electronic device 1000).

In FIGS. 4 and 5, the edge data network 2000 may further obtain, from the electronic device 1000, a frame index of the first partial image 312 being currently reproduced by the electronic device 1000, in addition to the first bearing information. The edge data network 2000 may determine a frame index of the second predicted frame by referring to the frame index of the first partial image 312, which is obtained from the electronic device 1000.

As described above, when the edge data network 2000 determines that the second predicted bearing information matches the second bearing information, because the second predicted partial image 314 corresponding to the second predicted frame transmitted from the edge data network 2000 in operation S512 is identical to the second partial image 316 corresponding to the second bearing information at present, the electronic device 1000 may decode the second predicted frame previously cached as an I or P frame in the buffer of the electronic device 1000 and then reproduce the decoded second predicted frame.

However, when the edge data network 2000 determines that the second predicted bearing information matches the second bearing information, and the electronic device 1000 thus reproduces an image using the second predicted frame received from the edge data network 2000 and previously cached as an I or P frame in the buffer, a case in which an image is reproduced using a compensation frame when the edge data network 2000 determines that the second predicted bearing information does not match the second bearing information may exist together, and thus, a decoding operation of the electronic device 1000 according to buffer management or a referring relationship between frames may not be efficiently performed. Therefore, the electronic device 1000 according to the disclosure may effectively provide a VR image to the user by decoding a compensation frame generated by the electronic device 1000 and then caching the decoded compensation frame in the buffer when image prediction of the edge data network 2000 is successful, decoding a compensation frame received from the edge data network 2000 as in operation S428 and then sequentially caching the decoded compensation frame in the buffer when image prediction of the edge data network 2000 fails, and then rendering only the compensation frames stored in the buffer.

Figure 6:
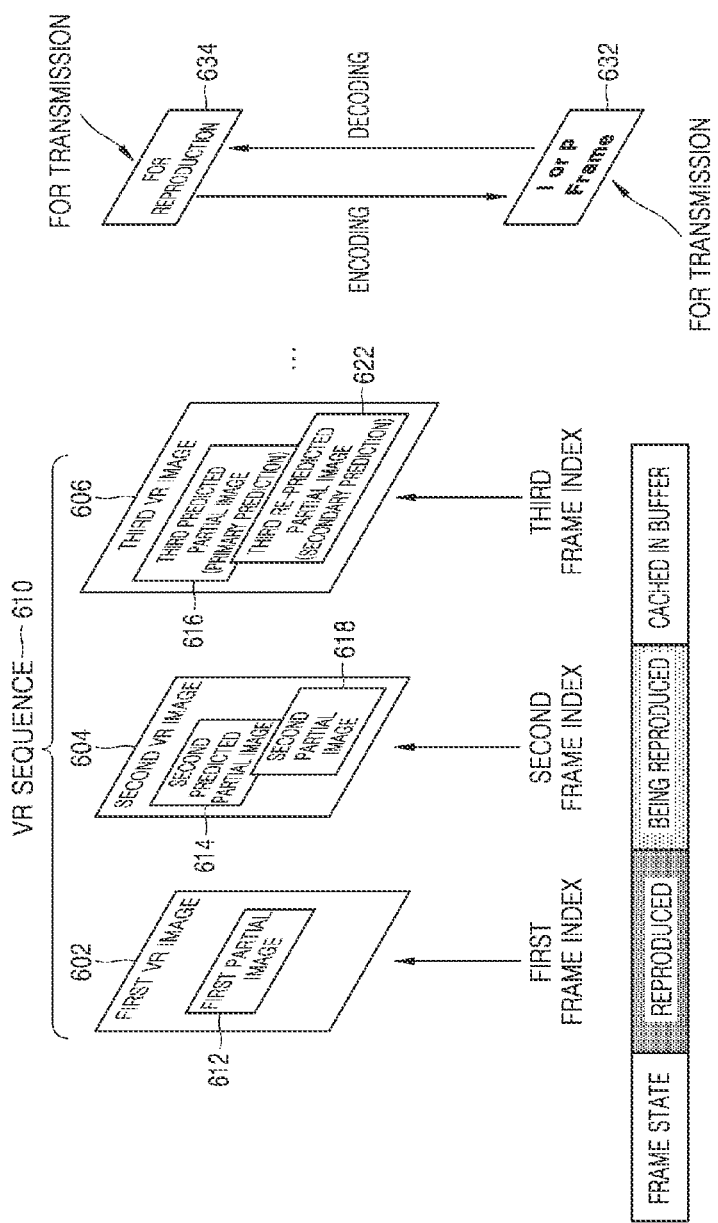
FIG. 6 is a diagram illustrating an example relationship between partial images to be transmitted between an electronic device and an edge data network, according to various embodiments.

FIG. 6 is a diagram illustrating an example relationship between partial images to be transmitted between an electronic device and an edge data network, according to various embodiments.

The edge data network 2000 may transmit only a partial image in a VR image corresponding to bearing information obtained from the electronic device 1000 instead of transmitting the entire VR image for VR to the electronic device 1000. FIGS. 3, 4, and 5 have been described under the assumption that the edge data network 2000 transmits a second predicted frame to the electronic device 1000, but FIGS. 6, 7, and 8 will be described under the assumption that the edge data network 2000 transmits both a second predicted frame and a third predicted frame to the electronic device 1000.

For example, the edge data network 2000 may effectively transmit video content to the electronic device 1000 by transmitting frames of a first partial image 612, a second predicted partial image 614, a third predicted partial image 616, and a third re-predicted partial image 622 to the electronic device 1000 instead of transmitting frames of a first VR image 602, a second VR image 604, and a third VR image 606 to the electronic device 1000.

According to various embodiments, the first partial image 612, the second predicted partial image 614, the third predicted partial image 616, and the third re-predicted partial image 622 shown in FIG. 6 may be partial images for respective frames 602, 604, and 606 in a VR sequence 610 including a plurality of frames. For example, the first partial image 612 may have the same frame index as the first VR image 602 including the first partial image 612, and the second predicted partial image 614 and a second partial image 618 may have the same frame index as the second VR image 604. In addition, the third predicted partial image 616 and the third re-predicted partial image 622 may have the same frame index as the third VR image 606.

In addition, according to various embodiments, the VR sequence 610 may be, as all or some of VR images, a set of all or some consecutive frames among a plurality of frames included in the VR images. For example, the VR sequence 610 may include the first VR image 602 having a first frame index, the second VR image 604 having a second frame index, and the third VR image 606 having a third frame index. In addition, the first partial image 612, the second predicted partial image 614, the third predicted partial image 616, and the third re-predicted partial image 622 may include bearing information for determining at which partial image in a VR image the user of the electronic device 1000 looks.

For example, the first partial image 612 may include first bearing information, and a location of the first partial image 612 in the first VR image 602 may be determined based on the first bearing information. In addition, the second predicted partial image 614 may include second predicted bearing information and a location of the second predicted partial image 614 in the second VR image 604 may be determined based on the second predicted bearing information. The third predicted partial image 616 may include third predicted bearing information and a location of the third predicted partial image 616 in the third VR image 606 may be determined based on the third predicted bearing information. A location of the third re-predicted partial image 622 in the third VR image 606 may be determined based on third re-predicted bearing information.

Bearing information may indicate a location of each partial image in a VR image, and the location of each partial image in the VR image may be determined based on the bearing information. According to various embodiments, bearing information indicating locations of partial images in VR images may include a three-axial angle value obtained from the sensing module 210 attached to the electronic device 1000, and a three-axial angle may be changed based on an input of the user wearing the electronic device 1000.

A predicted frame, e.g., an I or P frame 632, includes data generated by encoding partial images in a VR image, and a partial image 634 in the VR image indicates an image appearing when frames are decoded, and the decoded frames are displayed on the display of the electronic device 1000.

According to various embodiments, hereinafter, a description will be made below with reference to FIGS. 7 and 8 under the assumption that the first partial image 612 is a partial image in the first VR image 602 having the first frame index in the VR sequence 610, the second predicted partial image 614 and the second partial image 618 are partial images in the second VR image 604 having the second frame index in the VR sequence 610, and the third predicted partial image 616 and the third re-predicted partial image 622 are partial images in the third VR image 606 having the third frame index.

Figure 7:
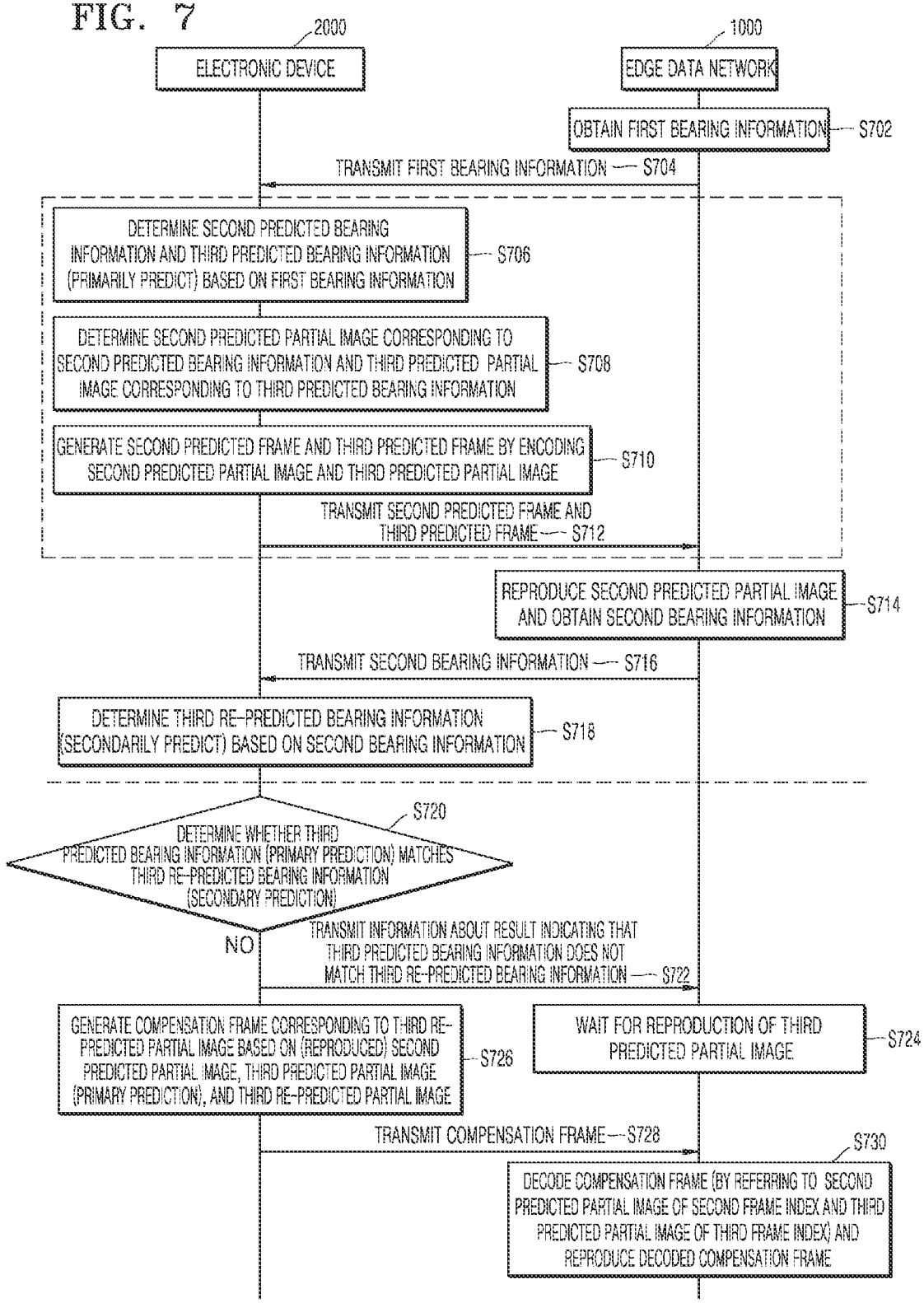
FIG. 7 is a sequence diagram illustrating an example operation between an electronic device and an edge data network, according to various embodiments.

FIG. 7 is a sequence diagram illustrating an example operation between the electronic device 1000 and the edge data network 2000, according to various embodiments.

In operation S702, the electronic device 1000 may obtain first bearing information. According to various embodiments, the electronic device 1000 may obtain, as the first bearing information, a three-axial angle value indicating a location of the first partial image 612 in the first VR image 602 using the sensing module 210 in the electronic device 1000. According to another example embodiment, the first bearing information may include a plurality of pieces of bearing information of partial images reproduced before the first partial image 612 is reproduced by the electronic device 1000. In operation S704, the electronic device 1000 may transmit the first bearing information to the edge data network 2000.

In operation S706, the edge data network 2000 may determine (primarily predict) second predicted bearing information and third predicted bearing information based on the first bearing information. Although FIGS. 6 and 7 show that the edge data network 2000 determines two pieces of predicted bearing information (the second predicted bearing information and the third predicted bearing information), the disclosure is not limited thereto, and the edge data network 2000 may determine pieces of predicted bearing information of two or more partial images in at least one group of pictures (GOP).

In addition, although FIGS. 6 and 7 show that the second predicted partial image 614 corresponding to the second predicted bearing information is a partial image in the second VR image 604 having the second frame index, and the third predicted partial image 616 is a partial image in the third VR image 606 having the third frame index, the second predicted partial image 614 and the third predicted partial image 616 may be partial images in VR images having a predetermined frame index interval.

According to various embodiments, the edge data network 2000 may determine the second predicted bearing information and the third predicted bearing information based on the first bearing information so that the second predicted bearing information and the third predicted bearing information are identical to the first bearing information. However, the various embodiments are not limited thereto, and the second predicted bearing information and the third predicted bearing information may be determined according to a method, performed by the edge data network 2000, of determining predicted bearing information, which is to be described with reference to FIGS. 10, 11, 12, and 13.

In operation S708, the edge data network 2000 may determine the second predicted partial image 614 corresponding to the second predicted bearing information and the third predicted partial image 616 corresponding to the third predicted bearing information. For example, the edge data network 2000 may identify the second predicted partial image 614 corresponding to the second predicted bearing information from the VR sequence 610 stored in the DB, using the determined second predicted bearing information, and identify the third predicted partial image 616 from the VR sequence 610 in the DB using the third predicted bearing information in the same manner.

In operation S710, the edge data network 2000 may generate a second predicted frame and a third predicted frame by encoding the second predicted partial image 614 and the third predicted partial image 616. According to various embodiments, the second predicted frame and the third predicted frame generated by the edge data network 2000 may be I frames or P frames. In operation S712, the edge data network 2000 may transmit the generated second predicted frame and third predicted frame to the electronic device 1000. According to various embodiments, the edge data network 2000 may separately store, in the DB of the edge data network 2000, the second predicted frame and the third predicted frame transmitted to the electronic device 1000. According to another example embodiment, the edge data network 2000 may separately store, in the DB, only the second predicted bearing information and the third predicted bearing information respectively corresponding to the second predicted frame and the third predicted frame transmitted to the electronic device 1000.

In operation S714, the electronic device 1000 may reproduce the second predicted partial image 614 and obtain second bearing information corresponding to the second partial image 618. In more detail, the electronic device 1000 may decode the second predicted frame among the second predicted frame and the third predicted frame received from the edge data network 2000 and reproduce the second predicted partial image 614 using the decoded second predicted frame. While the electronic device 1000 is reproducing the second predicted partial image 614, the third predicted frame may be cached in the buffer of the electronic device 1000.

According to various embodiments, the electronic device 1000 may obtain the second bearing information from the sensing module 210 in the electronic device 1000 at a time point when it is predicted to reproduce the second predicted partial image 614, a time point when a preset time elapses from a time point when the second partial image 614 is reproduced, or while the second predicted partial image 614 is being reproduced. That is, the electronic device 1000 may reproduce the second predicted partial image 614 predicted by the edge data network 2000 and also obtain, as the second bearing information, a location of a partial image at a point which the user of the electronic device 1000 is actually going to view at present.

According to various embodiments, when the second bearing information obtained by the electronic device 1000 does not match the second predicted bearing information predicted by the edge data network 2000, video content may not be displayed on a portion of a viewport region of the display device of the electronic device 1000. Therefore, according to various embodiments, to solve a problem that video content is not displayed on a portion of the viewport region of the electronic device 1000 when image prediction of the edge data network 2000 fails, the edge data network 2000 may transmit, to the electronic device 1000, predicted frames generated by encoding predicted partial images having a size greater than a preset size of the viewport region of the electronic device 1000. In operation S716, the electronic device 1000 may transmit the second bearing information to the edge data network 2000.

In operation S718, the edge data network 2000 may determine (secondarily predict) third re-predicted bearing information based on the second bearing information. In operation S720, the edge data network 2000 may determine whether the third predicted bearing information matches the third re-predicted bearing information. For example, the edge data network 2000 may determine that the third predicted bearing information does not match the third re-predicted bearing information, when an average of difference values of angular components (e.g., pitch, roll, and yaw) in the third predicted bearing information and the third re-predicted bearing information is greater than or equal to a preset threshold angle.

In addition, according to another example embodiment, instead of comparing the third predicted bearing information to the third re-predicted bearing information similarly to operation S418 of FIG. 4, the third predicted partial image 616 corresponding to the third predicted bearing information may be compared to the third re-predicted partial image 622 corresponding to the third re-predicted bearing information.

In operation S722, the edge data network 2000 may transmit, to the electronic device 1000, information about a comparison result indicating that the third predicted bearing information does not match the third re-predicted bearing information. In operation S724, the electronic device 1000 may wait for reproduction of the third predicted partial image 616 based on the comparison result indicating that the third predicted bearing information does not match the third re-predicted bearing information.

In operation S726, the edge data network 2000 may generate a compensation frame corresponding to the third re-predicted partial image 622 based on the second predicted partial image 614, the third predicted partial image 616, and the third re-predicted partial image 622 in response to the determination that the third predicted bearing information does not match the third re-predicted bearing information.

In more detail, based on determining that the third predicted bearing information does not match the third re-predicted bearing information, the edge data network 2000 may identify the third re-predicted partial image 622 from the VR sequence 610 in the DB using third re-predicted bearing information newly determined based on the second bearing information obtained from the electronic device 1000.

According to various embodiments, the second predicted partial image 614 is being reproduced by the electronic device 1000, and the second predicted frame generated by encoding the second predicted partial image 614 may be already stored in the DB of the edge data network 2000. The edge data network 2000 may generate the compensation frame corresponding to the third re-predicted partial image 622 so as to refer to at least some blocks in the second predicted frame and the third predicted frame transmitted to the electronic device 1000 in operation S712.

Particularly, the edge data network 2000 may determine, as third difference information, information about a difference between image information in the second predicted frame corresponding to the second predicted partial image 614 and image information in a third re-predicted frame corresponding to the third re-predicted partial image 622; determine, as fourth difference information, information about a difference between the image information in the third re-predicted frame corresponding to the third re-predicted partial image 622 and image information in the third predicted frame corresponding to the third predicted partial image 616; and generate the compensation frame corresponding to the third re-predicted partial image 622 using the third difference information and the fourth difference information.

According to various embodiments, the third difference information may include third reference block information indicating a block address (or location) in the second predicted frame and a block address (or location) in the third re-predicted frame, which is used to determine the third difference information, and information about a pixel difference between a block in the second predicted frame and a block in the third re-predicted frame, which is used to determine the third difference information.

In addition, according to various embodiments, the fourth difference information may include fourth reference block information indicating the block address (or location) in the third re-predicted frame and a block address (or location) in the third predicted frame, which is used to determine the fourth difference information, and information about a pixel difference between the block in the third re-predicted frame and a block in the third predicted frame, which is used to determine the fourth difference information.

According to various embodiments, the edge data network 2000 may sequentially obtain, from the encoder, a P frame corresponding to the second predicted partial image 614 and a P frame corresponding to the third predicted partial image 616 by inputting, to the encoder, the second predicted partial image 614, the third re-predicted partial image 622, and the third predicted partial image 616 in that order, but an encoding sequence of the encoder is not limited thereto. That is, the encoder in the edge data network 2000 may generate the compensation frame by encoding the second predicted partial image 614 to the second predicted frame, encoding the third predicted partial image 616 to the third predicted frame, and then encoding the third re-predicted partial image 622 so as to refer to at least some blocks in the encoded second predicted frame and at least some blocks in the encoded third predicted frame. In operation S728, the edge data network 2000 may transmit the generated compensation frame to the electronic device 1000.

In operation S730, the electronic device 1000 may decode the compensation frame and reproduce the decoded compensation frame. For example, the electronic device 1000 may identify the third reference block information and the fourth reference block information in the compensation frame and decode the compensation frame by referring to some blocks in the second predicted frame corresponding to the identified third reference block information and some blocks in the third predicted frame corresponding to the fourth reference block information. The electronic device 1000 may decode the compensation frame and deliver the decoded compensation frame to the display device of the electronic device 1000 so that the third re-predicted partial image 622 is reproduced.

According to various embodiments, before a time point when it is predicted to reproduce the third re-predicted partial image 622 while the electronic device 1000 is reproducing the second predicted partial image 614, the electronic device 1000 may cache the decoded compensation frame in the buffer of the electronic device 1000.

Although the edge data network 2000 predicts the second predicted bearing information and transmits the predicted second predicted bearing information to the electronic device 1000, when the second bearing information obtained by the electronic device 1000 does not match the second predicted bearing information while the second predicted partial image 614 is being reproduced by the electronic device 1000, there is a high possibility that third bearing information to be obtained by the electronic device 1000 while the third predicted partial image 616 corresponding to the third predicted bearing information is being reproduced by the electronic device 1000 does not match the third predicted bearing information either.

Therefore, according to the method described above with reference to FIG. 7, the edge data network 2000 may determine the third predicted bearing information based on the first bearing information and then determine the third re-predicted bearing information based on the newly obtained second bearing information, so as to more accurately predict an image which the user of the electronic device 1000 is going to view.

Figure 8:
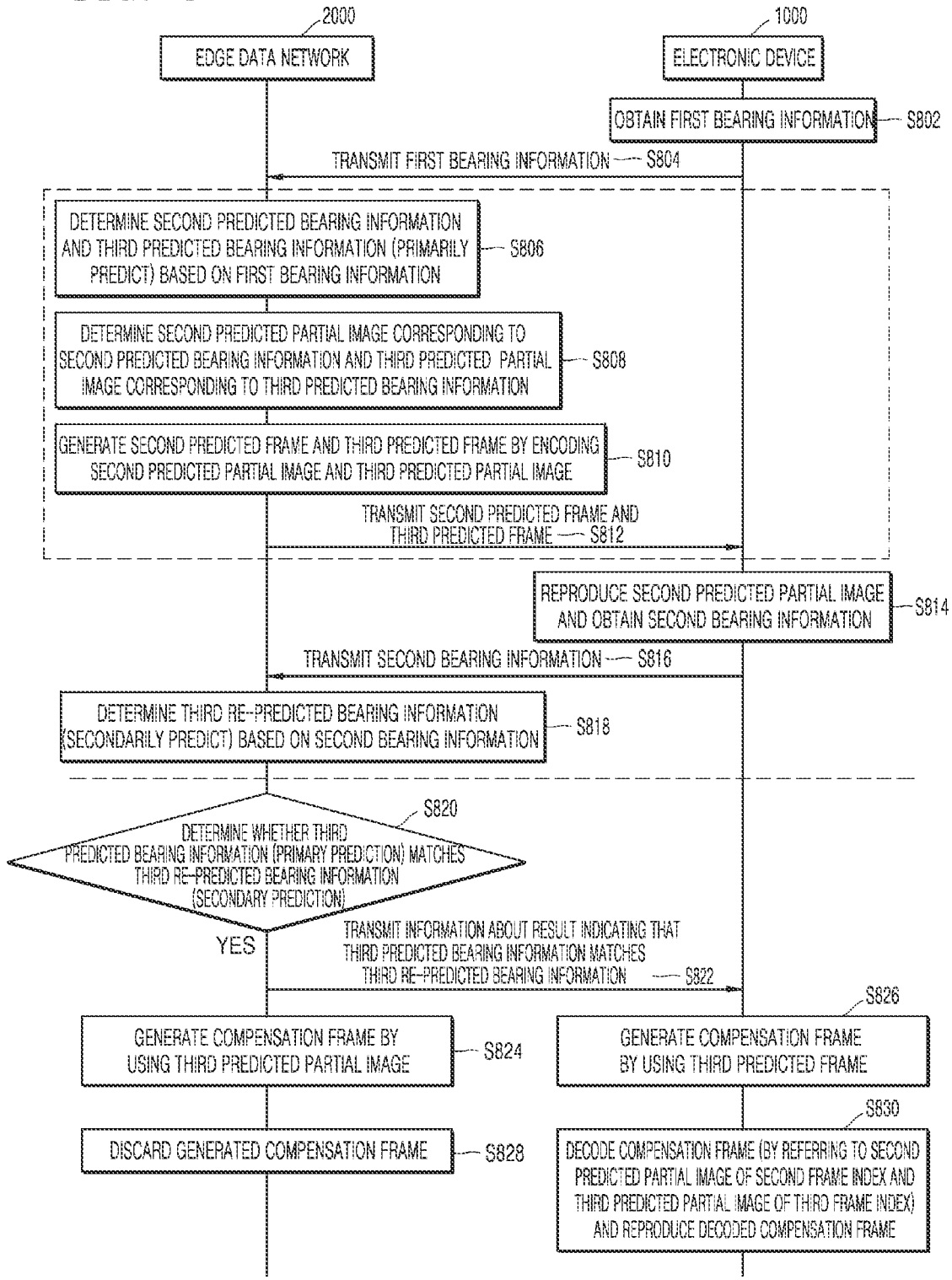
FIG. 8 is a sequence diagram illustrating an example operation between an electronic device and an edge data network, according to various embodiments.

FIG. 8 is a sequence diagram illustrating an example operation between the electronic device 1000 and the edge data network 2000, according to various embodiments.

An operation procedure between the electronic device 1000 and the edge data network 2000 when the third predicted bearing information does not match the third re-predicted bearing information has been described above with reference to FIG. 7, and an operation procedure between the electronic device 1000 and the edge data network 2000 when the third predicted bearing information matches the third re-predicted bearing information will now be described with reference to FIG. 8. Operations S802 to S818 of FIG. 8 may correspond to operations S702 to S718 of FIG. 7, and thus, detailed descriptions thereof are not repeated here.

In operation S820, the edge data network 2000 may determine whether the third predicted bearing information matches the third re-predicted bearing information. For example, the edge data network 2000 may determine that the third predicted bearing information matches the third re-predicted bearing information, when an average of difference values of angular components (e.g., pitch, roll, and/or yaw) in the third predicted bearing information and the third re-predicted bearing information is less than the preset threshold angle.

In operation S822, the edge data network 2000 may transmit, to the electronic device 1000, information about a comparison result indicating that the third predicted bearing information matches the third re-predicted bearing information. In operation S824, the edge data network 2000 may generate a compensation frame by encoding the third predicted partial image 616 pre-stored in the DB when the third predicted bearing information matches the third re-predicted bearing information.

In more detail, based on determining that the third predicted bearing information matches the third re-predicted bearing information, the edge data network 2000 may generate a compensation frame which refers to at least some blocks in the third predicted frame generated by encoding the third predicted partial image 616.

In operation S826, the electronic device 1000 may generate a compensation frame having the same image information as that of the third predicted frame received in operation S812, based on the comparison result indicating that the third predicted bearing information matches the third re-predicted bearing information. The electronic device 1000 may reproduce an image using, for example, only the compensation frame to efficiently provide video content to the user without affecting a decoding order of an I or P frame cached in the buffer of the electronic device 1000. Therefore, the electronic device 1000 may generate the compensation frame having the same image information as that of the third predicted frame even when the comparison result indicating that the third predicted bearing information matches the third re-predicted bearing information is received. Operation S826 may correspond to operation S524 of FIG. 5, and thus, detailed descriptions thereof are not repeated here.

In operation S828, the edge data network 2000 may discard the generated compensation frame. For example, because the third predicted bearing information has been determined to match the third re-predicted bearing information, the edge data network 2000 may determine that the third predicted partial image 616 is identical to the third re-predicted partial image 622, and because the third predicted frame generated by encoding the third predicted partial image 616 is transmitted to the electronic device 1000 at present, the edge data network 2000 does not have to transmit a separate compensation frame to the electronic device 1000. Therefore, the edge data network 2000 may discard the generated compensation frame without transmitting the generated compensation frame to the electronic device 1000.

According to various embodiments, when the third predicted bearing information matches the third re-predicted bearing information, the edge data network 2000 may not generate a separate compensation frame. However, even when the third predicted bearing information matches the third re-predicted bearing information, to be synchronized with a decoding operation performed by the electronic device 1000, the edge data network 2000 according to the disclosure may generate a compensation frame separately from an operation, performed by the electronic device 1000, of generating a compensation frame.

In operation S830, the electronic device 1000 may decode the compensation frame generated in operation S826 and reproduce the decoded compensation frame. For example, the electronic device 1000 may obtain the reference block information in the compensation frame and decode the compensation frame by referring to some blocks in a frame to which the compensation frame refers, based on the obtained reference block information. At present, the third predicted frame includes the same image information as the compensation frame, and thus, the electronic device 1000 may decode the compensation frame by referring to only the third predicted frame.

Figure 9:
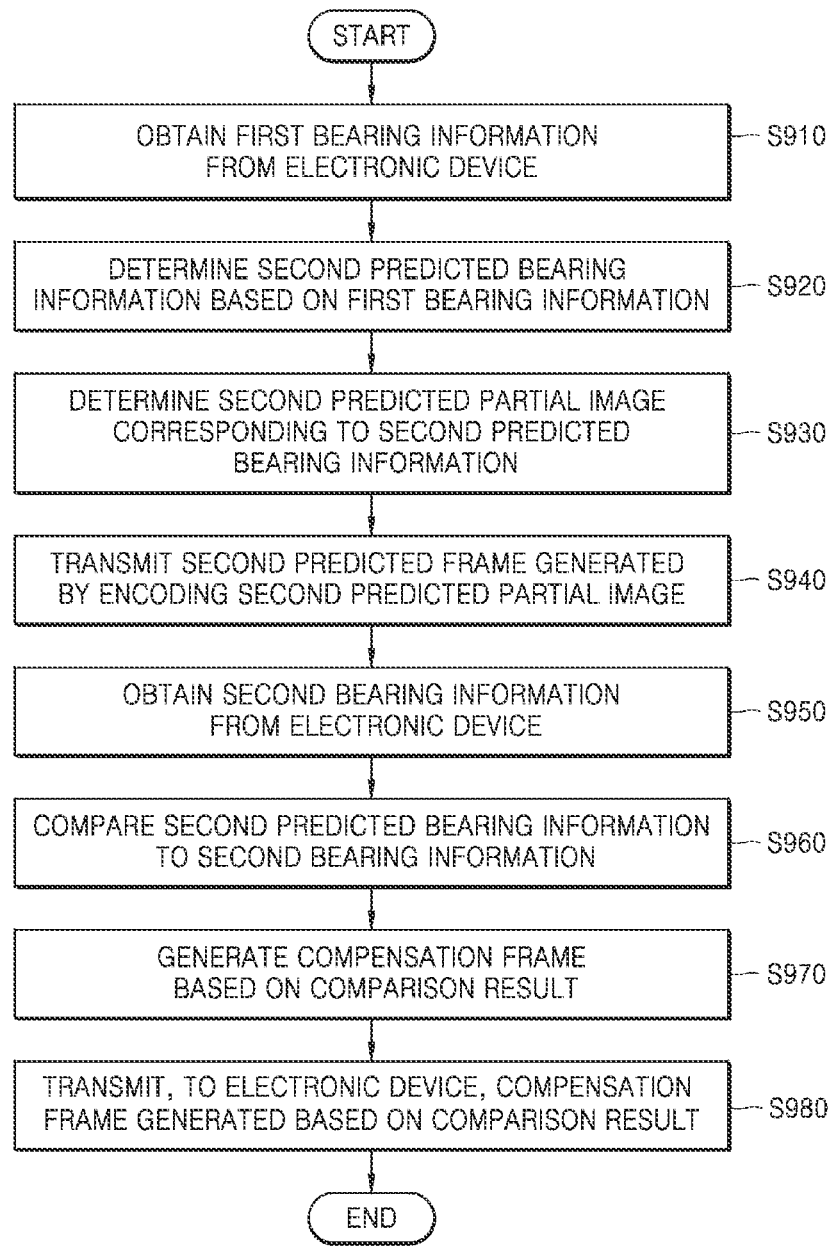
FIG. 9 is a flowchart illustrating an example method, performed by an edge data network, of streaming video content, according to various embodiments.

FIG. 9 is a flowchart illustrating an example method, performed by an edge data network, of streaming video content, according to various embodiments.

In operation S910, the edge data network 2000 may obtain first bearing information from the electronic device 1000. Operation S910 may correspond to operation S402 of FIG. 4, and thus, detailed descriptions thereof are not repeated here.

In operation S920, the edge data network 2000 may determine second predicted bearing information based on the first bearing information. Operation S920 may correspond to operation S406 of FIG. 4. Operation S920 will be described in greater detail below with reference to FIGS. 10, 11, 12, and 13.

In operation S930, the edge data network 2000 may determine a second predicted partial image corresponding to the second predicted bearing information. Operation S930 may correspond to operation S408 of FIG. 4, and thus detailed descriptions thereof are not repeated here.

In operation S940, the edge data network 2000 may transmit, to the electronic device 1000, a second predicted frame generated by encoding the second predicted partial image. Operation S940 may correspond to operations S410 to S420 of FIG. 4, and thus, detailed descriptions thereof are not repeated here.

In operation S950, the edge data network 2000 may obtain second bearing information from the electronic device 1000. Operation S950 may correspond to operation S414 of FIG. 4, and thus, detailed descriptions thereof are not repeated here.

In operation S960, the edge data network 2000 may compare the second predicted bearing information to the second bearing information. Although not shown in FIG. 9, after operation S960, the edge data network 2000 may further perform transmitting, to the electronic device 1000, information about a comparison result between the second predicted bearing information and the second bearing information. Operation S960 may correspond to operation S418 of FIG. 4, and thus, detailed descriptions thereof are not repeated here.

In operation S970, the edge data network 2000 may generate a compensation frame based on the comparison result between the second predicted bearing information and the second bearing information. For example, based on determining that the second predicted bearing information does not match the second bearing information, the edge data network 2000 may generate a compensation frame corresponding to a second partial image based on a first partial image, the second predicted partial image, and the second partial image. A particular method, performed by the edge data network 2000, of generating a compensation frame when the second predicted bearing information does not match the second bearing information may correspond to operation S424 of FIG. 4, and thus, detailed descriptions thereof are not repeated here.

In addition, based on determining that the second predicted bearing information matches the second bearing information, the edge data network 2000 may determine that the second predicted partial image is identical to the second partial image, and generate a compensation frame which refers to at least some blocks in the second predicted frame. A method, performed by the edge data network 2000, of generating a compensation frame based on determining that the second predicted bearing information matches the second bearing information may correspond to operation S522, and thus, detailed descriptions thereof are not repeated here.

In operation S980, the edge data network 2000 may transmit, to the electronic device 1000, the compensation frame generated based on the comparison result between the second predicted bearing information and the second bearing information. For example, the edge data network 2000 may discard the generated compensation frame when the second predicted bearing information matches the second bearing information. However, when the second predicted bearing information does not match the second bearing information, the edge data network 2000 may transmit the generated compensation frame to the electronic device 1000.

Operation S980 may correspond to operation S426 of FIG. 4 or S526 of FIG. 5, and thus, detailed descriptions thereof are not repeated here.

Figure 10:
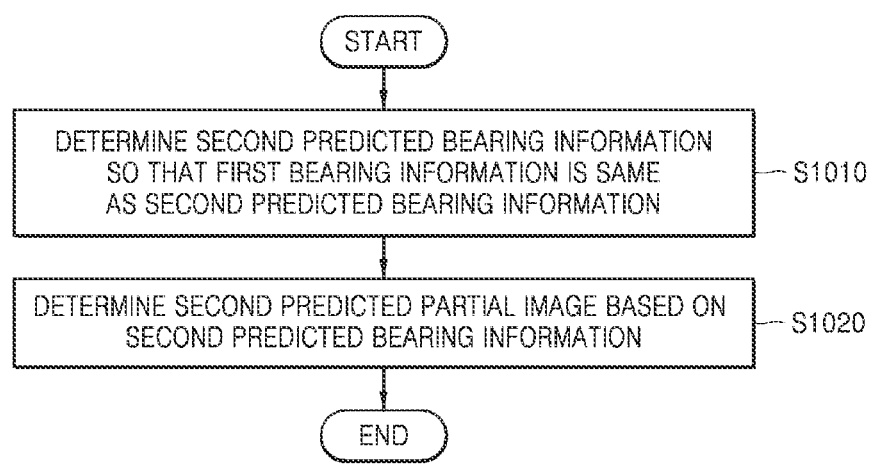
FIG. 10 is a flowchart illustrating an example method, performed by an edge data network, of determining second predicted bearing information and determining a second predicted partial image based on the second predicted bearing information, according to various embodiments.

FIG. 10 is a flowchart illustrating an example method, performed by an edge data network, of determining second predicted bearing information and determining a second predicted partial image based on the second predicted bearing information, according to various embodiments.

A particular example of operations, performed by the edge data network 2000, of determining (S920) second predicted bearing information based on first bearing information and determining (S930) a second predicted partial image corresponding to the determined second predicted bearing information will now be described with reference to FIG. 10.

In operation S1010, the edge data network 2000 may determine second predicted bearing information so that first bearing information obtained from the electronic device 1000 is identical to the second predicted bearing information. For example, the first bearing information and the second predicted bearing information may, for example, include a pitch angular component, a roll angular component, and a yaw angular component as three-axial angular components. According to various embodiments, when the first bearing information obtained from the electronic device 1000 includes 30 degrees, 45 degrees, and 60 degrees in the order of a pitch angular component, a roll angular component, and a yaw angular component, the edge data network 2000 may determine the second predicted bearing information as 30 degrees, 45 degrees, and 60 degrees.

In operation S1020, the edge data network 2000 may determine a second predicted partial image using the second predicted bearing information. For example, the edge data network 2000 may store a VR sequence for all frames in the DB and identify the second predicted partial image from the VR sequence in the DB using the second predicted bearing information.

According to various embodiments, the edge data network 2000 may further receive, from the electronic device 1000, information about a frame index indicating a particular frame number in the VR sequence, which is predicted to be reproduced by the electronic device 1000, in addition to the first bearing information. For example, when information about a frame index, which is obtained from the electronic device 1000, indicates a second frame index in the VR sequence, the edge data network 2000 may identify a second VR image corresponding to the second frame index of the VR sequence, which is pre-stored in the DB, and identify the second predicted partial image corresponding to the second predicted bearing information in the identified second VR image.

Figure 11:
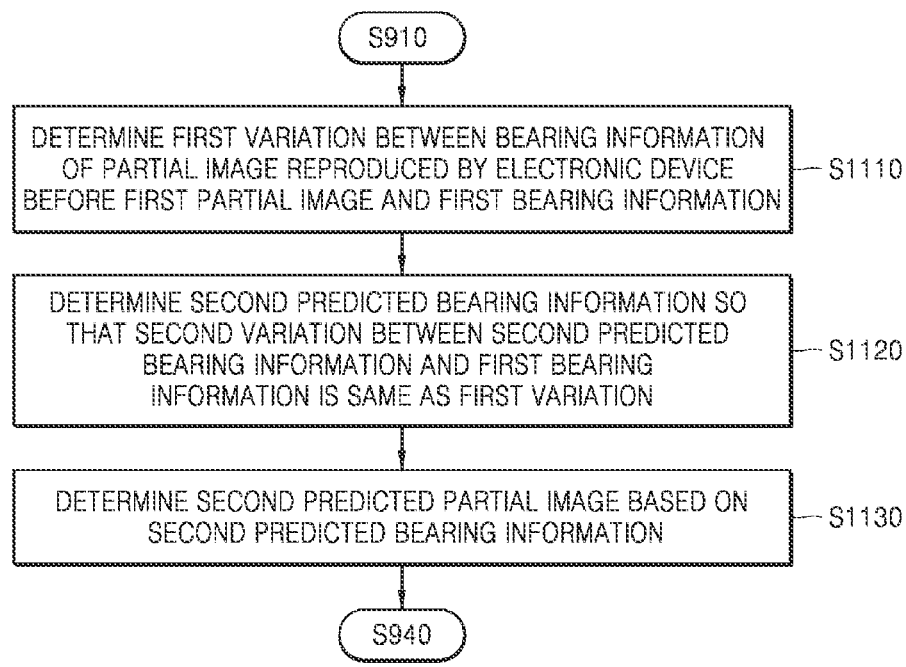
FIG. 11 is a flowchart illustrating an example method, performed by an edge data network, of determining second predicted bearing information and determining a second predicted partial image based on the second predicted bearing information, according to various embodiments.

FIG. 11 is a flowchart illustrating an example method, performed by an edge data network, of determining second predicted bearing information and determining a second predicted partial image based on the second predicted bearing information, according to various embodiments.

A method, performed by the edge data network 2000, of determining second predicted bearing information and determining a second predicted partial image corresponding to the determined second predicted bearing information, according to various embodiments, will now be described with reference to FIG. 11.

In operation S1110, the edge data network 2000 may determine a first variation between bearing information of partial images reproduced by the electronic device 1000 before a first partial image and first bearing information. For example, when bearing information includes, for example, three-axial angular components, bearing information of a partial image reproduced by the electronic device 1000 before the first partial image is (x0, y0, z0), and the first bearing information is (x1, y1, z1), the first variation may be (x1−x0, y1−y0, z1−z0).

In operation S1120, the edge data network 2000 may determine second predicted bearing information so that a second variation between the second predicted bearing information and the first bearing information is identical to (same as) the first variation. For example, the edge data network 2000 may determine the second variation as (X−x1, Y−y1, Z−z1) when the second predicted bearing information is (X,Y,Z). The edge data network 2000 may determine the second predicted bearing information so that the second variation (X−x1, Y−y1, Z−z1) is identical to the first variation (x1−x0, y1−y0, z1−z0).

In operation S1130, the edge data network 2000 may determine a second predicted partial image based on the second predicted bearing information. A method, performed by the edge data network 2000, of identifying the second predicted partial image from the DB using the second predicted bearing information may correspond to operation S408 of FIG. 4, and thus detailed descriptions thereof are not repeated here.

Figure 12:
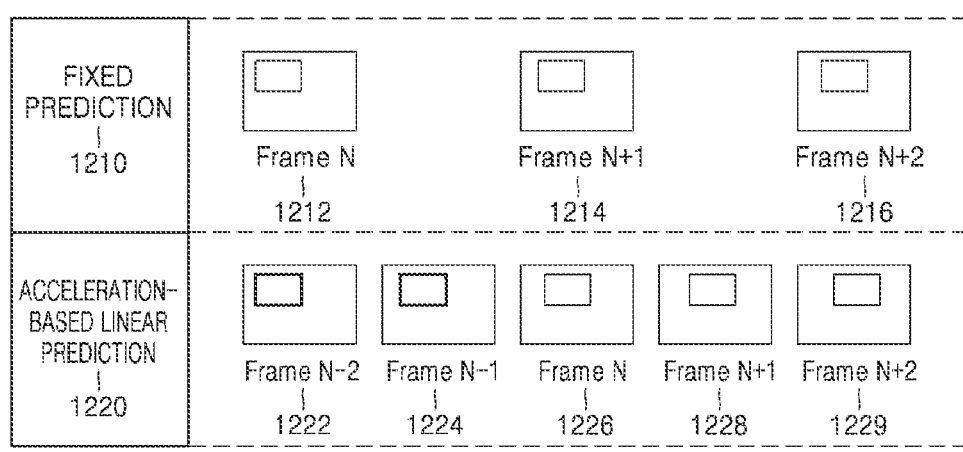
FIG. 12 is a diagram illustrating an example method, performed by an edge data network, of determining second predicted bearing information and determining a second predicted partial image based on the second predicted bearing information, according to various embodiments.

FIG. 12 is a diagram illustrating an example method, performed by an edge data network, of determining second predicted bearing information and determining a second predicted partial image based on the second predicted bearing information, according to various embodiments.

As described above with reference to FIG. 10, the edge data network 2000 may determine second predicted bearing information so that the second predicted bearing information is identical to first bearing information. In addition, similarly to the method of determining the second predicted bearing information, the edge data network 2000 may determine third predicted bearing information so that the third predicted bearing information is identical to the second predicted bearing information.

That is, referring to fixed prediction 1210 of FIG. 12, the edge data network 2000 may predict partial images for respective frame indices so that a VR image 1212 having a frame index of N, a VR image 1214 having a frame index of N+1, and a VR image 1216 having a frame index of N+2 have the same bearing information.

However, according to other example embodiments, as described above with reference to FIG. 11, the edge data network 2000 may determine the second predicted bearing information so that a variation between pieces of bearing information of partial images in two adjacent frames is identical. For example, referring to acceleration-based linear prediction 1220 of FIG. 12, the edge data network 2000 may predict bearing information of a partial image in a VR image 1226 having a frame index of N so that a variation between bearing information of a partial image in a VR image 1224 having a frame index of N−1 and bearing information of a partial image in a VR image 1222 having a frame index of N−2 is identical to a variation between the bearing information of the partial image in the VR image 1226 having the frame index of N and the bearing information of the partial image in the VR image 1224 having the frame index of N−1.

Likewise, the edge data network 2000 may predict bearing information of a partial image in a VR image 1228 having a frame index of N+1 and bearing information of a partial image in a VR image 1229 having a frame index of N+2 so that a variation between bearing information of a partial image in a VR image 1228 having a frame index of N+1 and the bearing information of the partial image in the VR image 1226 having the frame index of N is identical to a variation between the bearing information of the partial image in the VR image 1229 having the frame index of N+2 and the bearing information of the partial image in the VR image 1226 having the frame index of N+1.

Figure 13:
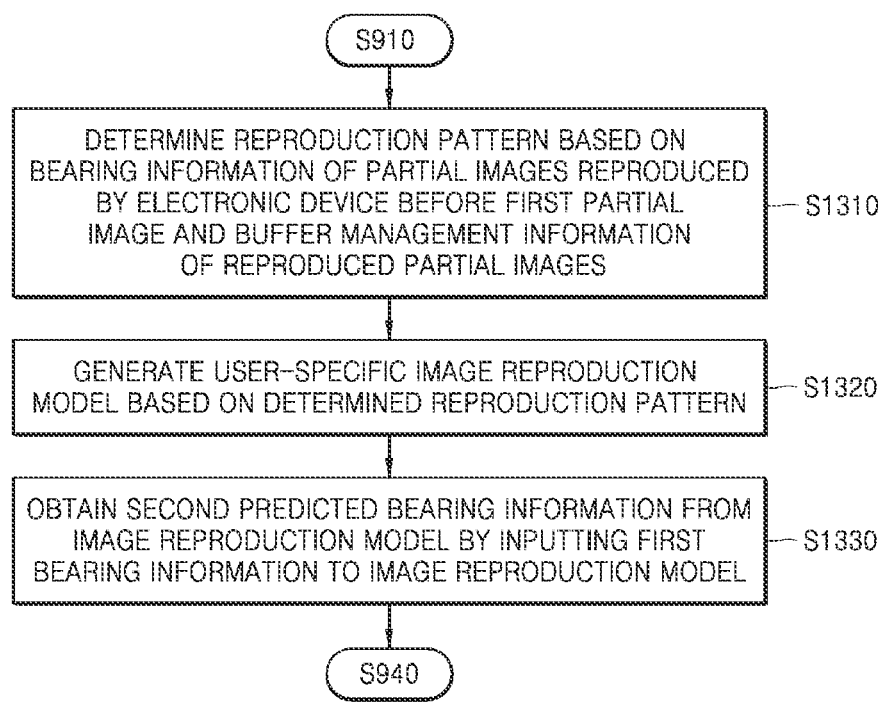
FIG. 13 is a flowchart illustrating an example method, performed by an edge data network, of determining second predicted bearing information and determining a second predicted partial image based on the second predicted bearing information, according to various embodiments.

FIG. 13 is a flowchart illustrating an example method, performed by an edge data network, of determining second predicted bearing information and determining a second predicted partial image based on the second predicted bearing information, according to various embodiments.

In operation S1310, the edge data network 2000 may determine a reproduction pattern based on bearing information of partial images reproduced by the electronic device 1000 before a first partial image and buffer management information of the reproduced partial images. For example, the edge data network 2000 may determine the reproduction pattern based on a variation between pieces of bearing information of partial images having two adjacent frame indices, which have been reproduced before the first partial image, and buffer management information of the partial images having the two frame indices.

In operation S1320, the edge data network 2000 may generate an image reproduction model based on the reproduction pattern. For example, the image reproduction model may include a plurality of neural network layers, each of the plurality of neural network layers having a plurality of weight values, and a neural network operation is performed through an operation between an operation result of a previous layer and the plurality of weight values.

The plurality of weight values of the plurality of neural network layers may be obtained or optimized by a training result of an artificial intelligence model. For example, the plurality of weight values may be updated so as to reduce or minimize a loss value or a cost value obtained by the artificial intelligence model during a training process. An artificial neural network may include a deep neural network (DNN), e.g., a convolutional neural network (CNN), a deep neural network (DNN), a recurrent neural network (RNN), a restricted Boltzmann machine (RBM), a deep belief network (DBN), a bidirectional recurrent deep neural network (BRDNN), or a deep Q-network, but is not limited thereto.

In operation S1330, the edge data network 2000 may obtain second predicted bearing information from the image reproduction model by inputting first bearing information to the image reproduction model. For example, the edge data network 2000 may train the image reproduction model based on the reproduction pattern determined in operation S1310, and when bearing information in a VR image having a previous frame index is input, the image reproduction model may output bearing information in a VR image having a subsequent frame index or a frame index separated by a predetermined interval from the previous frame index.

Figure 14:
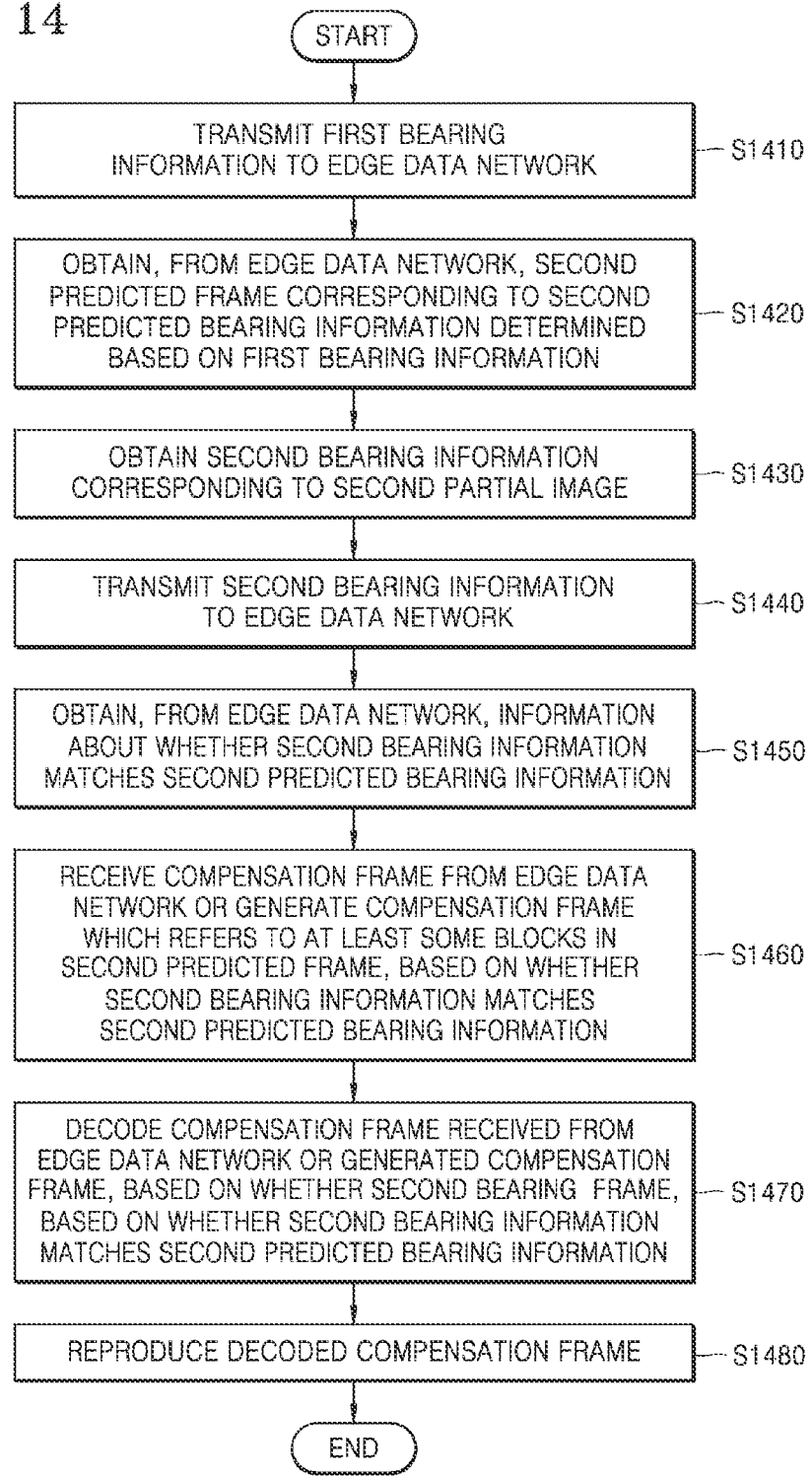
FIG. 14 is a flowchart illustrating an example method, performed by an electronic device, of streaming video content obtained from an edge data network, according to various embodiments.

FIG. 14 is a flowchart illustrating an example method, performed by an electronic device, of streaming video content obtained from an edge data network, according to various embodiments.

In operation S1410, the electronic device 1000 may transmit first bearing information to the edge data network 2000. For example, the first bearing information may include bearing information indicating a location of a first partial image in a first VR image, the first partial image being reproduced by the electronic device 1000. However, according to other example embodiments, the first bearing information may include a plurality of pieces of bearing information of partial images reproduced before the first partial image is reproduced by the electronic device 1000.

In operation S1420, the electronic device 1000 may obtain, from the edge data network 2000, a second predicted frame corresponding to second predicted bearing information determined based on the first bearing information. For example, the second predicted frame obtained by the electronic device 1000 may be an I or P frame generated by encoding a second predicted partial image corresponding to the second predicted bearing information in a second VR image. Although not shown in FIG. 14, the electronic device 1000 may cache, in the buffer of the electronic device 1000, the second predicted frame obtained from the edge data network 2000.

In operation S1430, the electronic device 1000 may obtain second bearing information corresponding to the second predicted frame. For example, the electronic device 1000 may obtain the second bearing information from the sensing module 210 in the electronic device 1000 at (a time point before a preset time from) a time point when the electronic device 1000 reproduces the second predicted partial image, (a time point before a preset time from) a time point when a preset time elapses from a time point when the first partial image was reproduced, or a time point before a preset time from a time point when the second predicted partial image is predicted to be reproduced. However, according to other example embodiments, the electronic device 1000 may decode the second predicted frame, reproduce the second predicted partial image using the decoded second predicted frame, and obtain the second bearing information corresponding to the second predicted frame while reproducing the second predicted partial image. In operation S1440, the electronic device 1000 may transmit the second bearing information to the edge data network 2000. In operation S1450, the electronic device 1000 may obtain, from the edge data network 2000, information about a comparison result indicating whether the second bearing information matches the second predicted bearing information.

In operation S1460, the electronic device 1000 may receive a compensation frame from the edge data network 2000 or generate a compensation frame which refers to at least some blocks in the second predicted frame, based on whether the second bearing information matches the second predicted bearing information. For example, based on information about a comparison result indicating that the second bearing information does not match the second predicted bearing information, the electronic device 1000 may wait for reproduction of the second predicted partial image and obtain a compensation frame corresponding to the second partial image, which is received from the edge data network 2000 while waiting for the reproduction of the second predicted partial image. However, based on information about a comparison result indicating that the second bearing information matches the second predicted bearing information, the electronic device 1000 may generate a compensation frame having the same image information as that of the second predicted frame.

In operation S1470, the electronic device 1000 may decode the compensation frame received from the edge data network 2000 or the compensation frame generated by the electronic device 1000, based on whether the second bearing information matches the second predicted bearing information.

For example, the electronic device 1000 may decode the compensation frame received from the edge data network 2000, based on the information about the comparison result indicating that the second bearing information does not match the second predicted bearing information. The electronic device 1000 may decode the compensation frame by referring to some blocks in a first frame and some blocks in a second predicted frame based on reference block information in the compensation frame.

According to other example embodiments, the electronic device 1000 may decode the compensation frame generated by the electronic device 1000, based on the information about the comparison result indicating that the second bearing information matches the second predicted bearing information. At present, the compensation frame generated by the electronic device 1000 includes the same image information as that of the second predicted frame, and thus, the electronic device 1000 may decode the compensation frame by referring, for example, to only at least some blocks in the second predicted frame. In operation S1480, the electronic device 1000 may reproduce the decoded compensation frame.

Figure 15:
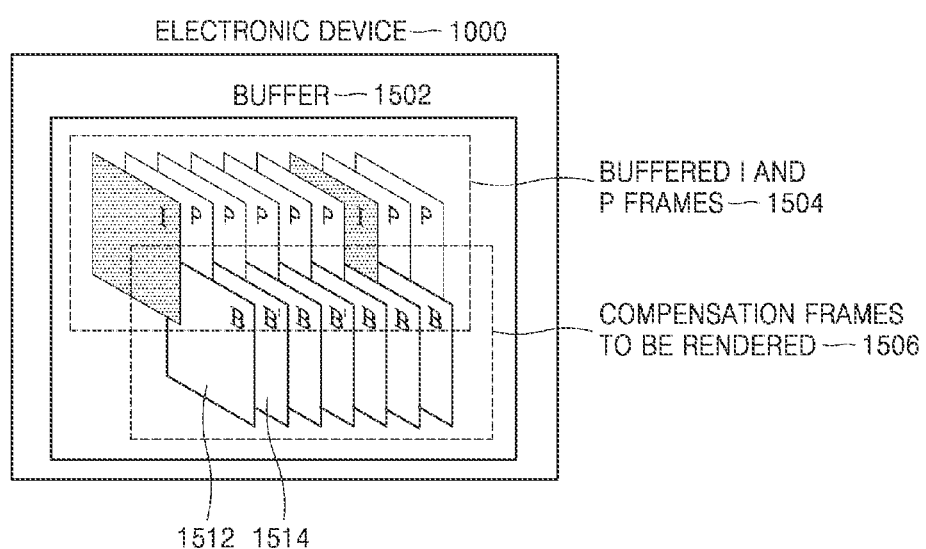
FIG. 15 is a diagram illustrating an example process, performed by an electronic device, of reproducing compensation frames stored in a buffer in the electronic device, according to various embodiments.

FIG. 15 is a diagram illustrating an example process, performed by the electronic device 1000, of reproducing compensation frames stored in a buffer in the electronic device 1000, according to various embodiments.

The electronic device 1000 may include at least one buffer 1502. For example, the electronic device 1000 may store, in the at least one buffer 1502, I and P frames 1504 generated by encoding partial images predicted by the edge data network 2000. When information about a comparison result indicating that second bearing information does not match second predicted bearing information is received from the edge data network 2000, the electronic device 1000 may obtain a compensation frame 1512 from the edge data network 2000 in a state of waiting for reproduction of a second predicted partial image.

However, when information about a comparison result indicating that the second bearing information matches the second predicted bearing information is received, the electronic device 1000 may generate a compensation frame 1514 having the same image information as that of a second predicted frame previously obtained from the edge data network 2000.

The electronic device 1000 may cache the compensation frames 1512 and 1514 as compensation frames 1506 in the at least one buffer 1502 in which predicted frames corresponding to the partial images predicted by the edge data network 2000 are stored, based on buffer management information.

The electronic device 1000 may decode the compensation frames 1512 and 1514 cached in the at least one buffer 1502 by referring to at least some blocks in at least one I or P frame adjacent to a compensation frame to be decoded and reproduce video content using only the decoded compensation frames. A particular method, performed by the electronic device 1000, of referring to an adjacent frame to decode a compensation frame may correspond to operation S428 of FIG. 4 or operation S528 of FIG. 5, and thus, detailed descriptions thereof are not repeated here.

The electronic device 1000 according to the disclosure may decode an I frame, a P frame, and a compensation frame by referring to the I or P frame cached in a buffer. However, the electronic device 1000 according to the disclosure may use only an I or P frame when encoded frames received from the edge data network 2000 are decoded, but when video content is reproduced, the electronic device 1000 may provide the video content to the user using only a compensation frame among the decoded frames. The electronic device 1000 may provide video content by delivering only a decoded compensation frame to the display device in the electronic device 1000, and thus, only information about real-time partial video content desired by the user of the electronic device 1000 may be effectively obtained from the edge data network 2000.

Figure 16:
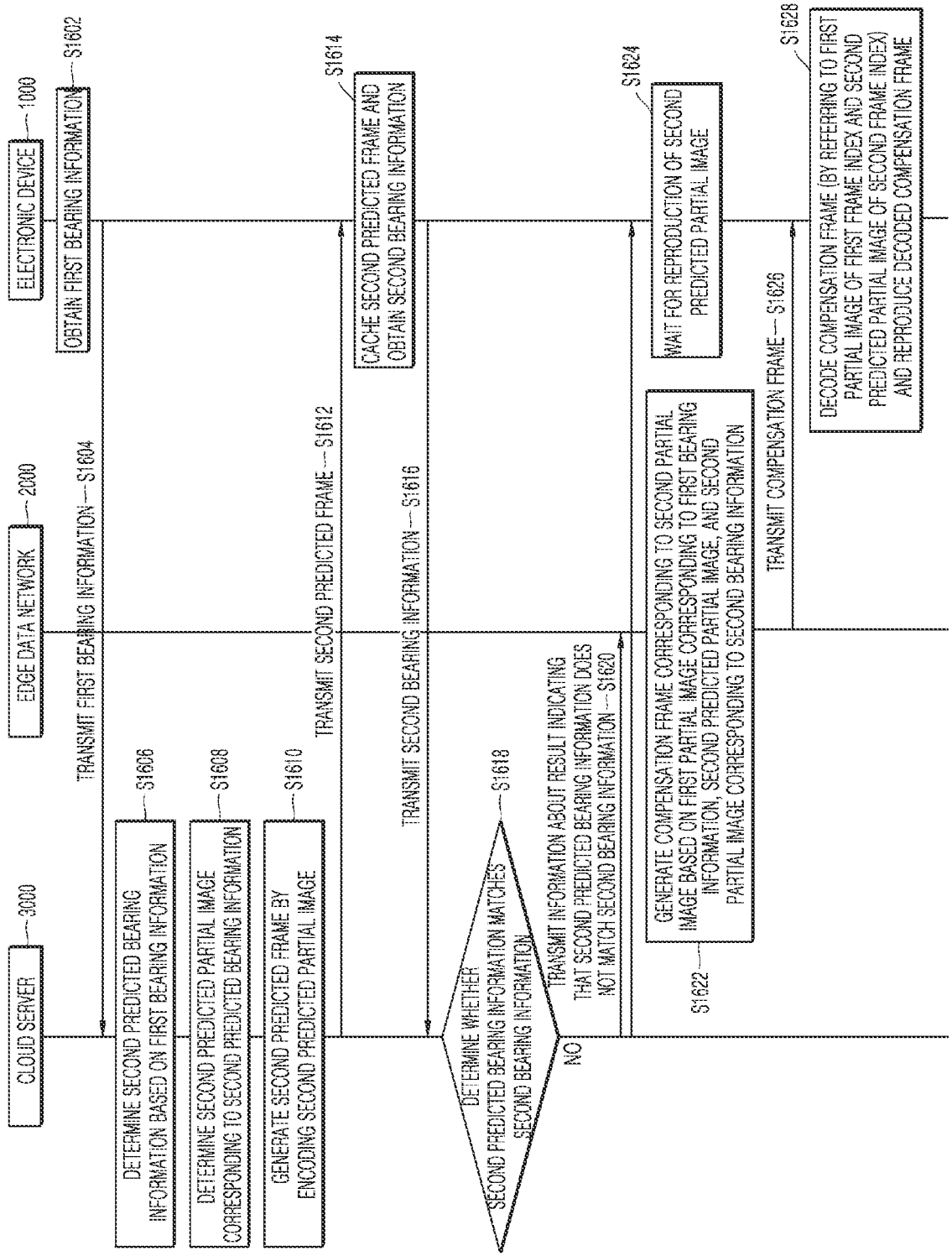
FIG. 16 is a sequence diagram illustrating an example operation among a cloud server, an electronic device, and an edge data network, according to various embodiments.

FIG. 16 is a sequence diagram illustrating an example operation among the cloud server 3000, the electronic device 1000, and the edge data network 2000, according to various embodiments.

According to various embodiments, the operation procedures between the electronic device 1000 and the edge data network 2000 in FIGS. 4 and 5 may be performed among the cloud server 3000, the electronic device 1000, and the edge data network 2000. In operation S1602, the electronic device 1000 may obtain first bearing information. Operation S1602 may correspond to operation S402 of FIG. 4, and thus, detailed descriptions thereof are not repeated here. In operation S1604, the electronic device 1000 may transmit the obtained first bearing information to the cloud server 3000.

In operation S1606, the cloud server 3000 may determine second predicted bearing information based on the first bearing information. A method, performed by the cloud server 3000, of determining the second predicted bearing information based on the first bearing information may correspond to the operation, performed by the edge data network 2000, of determining the second predicted bearing information, which has been described above with reference to FIGS. 10, 11, 12, and 13, and thus, detailed descriptions thereof are not repeated here.

In operation S1608, the cloud server 3000 may determine a second predicted partial image corresponding to the second predicted bearing information. Operation S1608 may correspond to the operation, performed by the edge data network 2000, of determining the second predicted partial image corresponding to the second predicted bearing information, which has been described above with reference to FIGS. 10, 11, 12, and 13, and thus, detailed descriptions thereof are not repeated here.

In operation S1610, the cloud server 3000 may generate a second predicted frame by encoding the second predicted partial image. According to various embodiments, the cloud server 3000 may transmit the second predicted frame to the electronic device 1000 and also store the second predicted frame in a DB of the cloud server 3000. In operation S1612, the cloud server 3000 may transmit the second predicted frame to the electronic device 1000.

In operation S1614, the electronic device 1000 may cache, in a buffer of the electronic device 1000, the second predicted frame obtained from the cloud server 3000 and obtain second bearing information from the sensing module 210 in the electronic device 1000. Operation S1614 may correspond to operation S414 of FIG. 4, and thus, detailed descriptions thereof are not repeated here. In operation S1616, the electronic device 1000 may transmit the second bearing information to the cloud server 3000.

In operation S1618, the cloud server 3000 may determine whether the second predicted bearing information matches the second bearing information. For example, the cloud server 3000 may determine that the second predicted bearing information does not match the second bearing information, when an average of difference values of angular components (e.g., pitch, roll, and/or yaw) in the second bearing information and the second predicted bearing information is greater than or equal to a preset threshold angle.

In operation S1620, the cloud server 3000 may transmit, to the edge data network 2000 and the electronic device 1000, information about a comparison result indicating that the second predicted bearing information does not match the second bearing information. In operation S1622, the edge data network 2000 may generate a compensation frame corresponding to a second partial image based on a first partial image, the second predicted partial image, and the second partial image. Operation S1622 may correspond to operation S424 of FIG. 4, and thus, detailed descriptions thereof are not repeated here.

In operation S1624, the electronic device 1000 may wait for reproduction of the second predicted partial image based on the information about the comparison result indicating that the second predicted bearing information does not match the second bearing information. In operation S1626, the edge data network 2000 may transmit the generated compensation frame to the electronic device 1000. In operation S1628, the electronic device 1000 may decode the compensation frame and reproduce the second partial image using the decoded compensation frame. For example, the electronic device 1000 may decode the compensation frame by referring to some blocks in a first frame corresponding to the first partial image and at least some blocks in the second predicted frame and deliver the decoded compensation frame to the display device in the electronic device 1000, so that the second partial image is reproduced.

Figure 17:
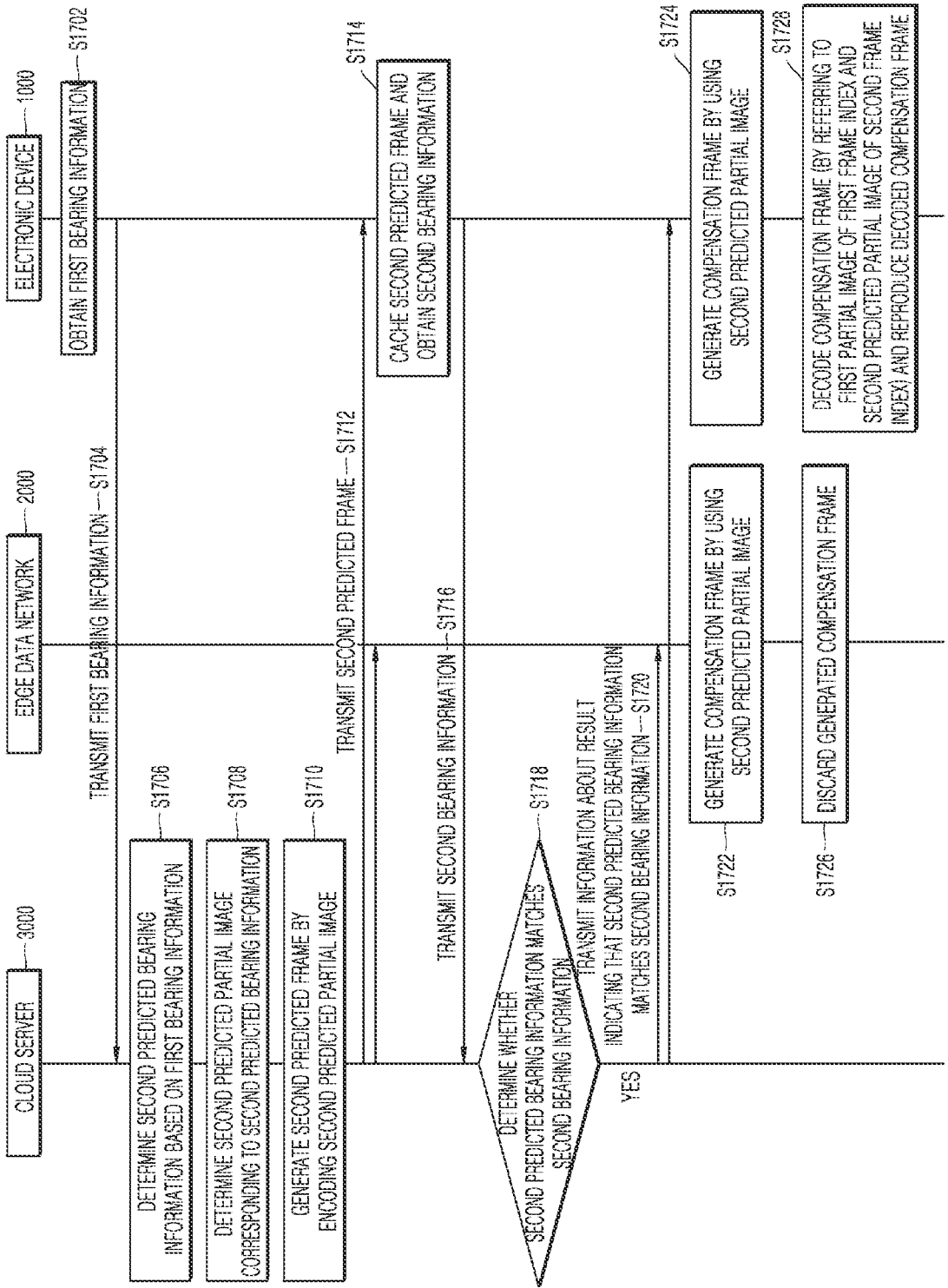
FIG. 17 is a sequence diagram illustrating an example operation among a cloud server, an electronic device, and an edge data network, according to various embodiments.

FIG. 17 is a sequence diagram illustrating an example operation among the cloud server 3000, the electronic device 1000, and the edge data network 2000, according to various embodiments.

An operation procedure among the electronic device 1000, the cloud server 3000, and the edge data network 2000 when the second predicted bearing information does not match the second bearing information has been described above with reference to FIG. 16, and an operation procedure among the cloud server 3000, the electronic device 1000, and the edge data network 2000 when the second predicted bearing information matches the second bearing information will now be described with reference to FIG. 17. Operations S1702 to S1710 of FIG. 17 may correspond to operations S1602 to S1610 of FIG. 16, and thus, detailed descriptions thereof are not repeated here.

In operation S1712, the cloud server 3000 may transmit the second predicted frame to the edge data network 2000 and the electronic device 1000. In operation S1714, the electronic device 1000 may cache, in a buffer of the electronic device 1000, the second predicted frame received from the cloud server 3000 and obtain second bearing information. Operation S1714 may correspond to operation S414 of FIG. 4, and thus, detailed descriptions thereof are not repeated here. In operation S1716, the electronic device 1000 may transmit the second bearing information to the cloud server 3000.

In operation S1718, the cloud server 3000 may determine whether the second predicted bearing information matches the second bearing information. For example, the cloud server 3000 may determine that the second predicted bearing information matches the second bearing information, when an average of difference values of angular components (e.g., pitch, roll, and/or yaw) in the second bearing information and the second predicted bearing information is less than the preset threshold angle.

In operation S1720, the cloud server 3000 may transmit, to the edge data network 2000 and the electronic device 1000, information about a comparison result indicating that the second predicted bearing information matches the second bearing information. In operation S1722, the edge data network 2000 may generate a compensation frame using the second predicted partial image. For example, the edge data network 2000 may generate a compensation frame having the same image information as that of the second predicted partial image.

In operation S1724, the electronic device 1000 may generate a compensation frame using the second predicted partial image. At present, because the second predicted bearing information is determined to match the second bearing information, the electronic device 1000 may generate a compensation frame which refers to at least some blocks in the second predicted frame. Operation S1724 may correspond to operation S524 of FIG. 5, and thus, detailed descriptions thereof are not repeated here.

In operation S1726, the edge data network 2000 may discard the compensation frame generated by the edge data network 2000. In operation S1728, the electronic device 1000 may decode the compensation frame generated in operation S1724 and reproduce the decoded compensation frame. At present, the second predicted frame includes the same image information as the compensation frame, and thus, the electronic device 1000 may decode the compensation frame by, for example, referring to only the second predicted frame. Operation S1728 may correspond to operation S528 of FIG. 5, and thus, detailed descriptions thereof are not repeated here.

FIG. 18 is a block diagram illustrating an example electronic device 110 according to various embodiments.

The electronic device 1000 connected to the edge data network 2000 in FIGS. 1 to 17 may correspond to the electronic device 110 of FIG. 18. For example, in a network environment 1700, the electronic device 110 may communicate with an electronic device 1702 over a first network 1798 (e.g., a short-range wireless communication network) or communicate with an electronic device 1704 or a server 1708 over a second network 1799 (e.g., a long-range wireless communication network). According to various embodiments, the electronic device 110 may communicate with the electronic device 1704 via the server 1708. According to various embodiments, the electronic device 110 may include a processor 1720, a memory 1730, an input device 1750, an acoustic output device 1755, a display device 1760, an audio module 1770, a sensor module 1776, an interface 1777, a haptic module 1779, a camera module 1780, a power management module 1788, a battery 1789, a communication module 1790, a subscriber identification module 1796, and an antenna module 1797. In some example embodiments, in the electronic device 110, at least one (e.g., the display device 1760 or the camera module 1780) of the components may be omitted, or one or more other components may be further included. In some example embodiments, some of the components may be implemented as an integrated circuit. For example, the sensor module 1776 (e.g., a fingerprint sensor, an iris sensor, or an illuminance sensor) may be implemented by being embedded in the display device 1760 (e.g., a display).

The processor 1720 may execute, for example, software (e.g., a program 1740) to control at least one other component (e.g., a hardware or software component) of the electronic device 110, which is connected to the processor 1720, and perform various kinds of data processing or computation. According to various embodiments, as at least a portion of the data processing or computation, the processor 1720 may load, in a volatile memory 1732, a command or data received from another component (e.g., the sensor module 1776 or the communication module 1790), process the command or data stored in the volatile memory 1732, and store result data in a nonvolatile memory 1734.

According to various embodiments, the processor 1720 may execute an application client, and according to the execution of the application client, the processor 1720 may transmit, to the edge data network 2000, a request message for checking a network protocol to be used by the application client. In addition, the processor 1720 may receive, from the edge data network 2000, a response message indicating the network protocol to be used by the application client. The processor 1720 may update a network protocol to be used by a UE application, based on the response message. The processor 1720 may select a network socket corresponding to the updated network protocol. The processor 1720 may receive data generated for the application client, from the edge data network 2000 using the selected network socket.

According to various embodiments, the processor 1720 may include a main processor 1721 (e.g., a central processing unit (CPU) or an application processor (AP)) and an auxiliary processor 1723 (e.g., a graphics processing unit (GPU), an image signal processor (ISP), a sensor hub processor, or a communication processor (CP)) operable independently from or together with the main processor 1721. Additionally or alternatively, the auxiliary processor 1723 may be configured to use lower power than the main processor 1721 or to be specialized to a designated function. The auxiliary processor 1723 may be implemented separately from or as a portion of the main processor 1721.

The auxiliary processor 1723 may control at least some of functions or states related to at least one (e.g., the display device 1760, the sensor module 1776, or the communication module 1790) of the components in the electronic device 110 instead of the main processor 1721 while the main processor 1721 is in an inactive state (e.g., a sleep state) or together with the main processor 1721 while the main processor 1721 is in an active state (e.g., executing an application). According to various embodiments, the auxiliary processor 1723 (e.g., an ISP or a CP) may be implemented as a portion of another component (e.g., the camera module 1780 or the communication module 1790) functionally associated with the auxiliary processor 1723.

The memory 1730 may store various pieces of data to be used for at least one component (e.g., the processor 1720 or the sensor module 1776) in the electronic device 110. The data may include, for example, software (e.g., the program 1740) and input data or output data related to a command associated with the software. The memory 1730 may include the volatile memory 1732 and the nonvolatile memory 1734.

The program 1740 may be stored as software in the memory 1730 and may include, for example, an operating system (OS) 1742, middleware 1744, and an application 1746. According to various embodiments, the program 1740 may include, for example, the first application client 122 and the second application client 124 of FIG. 1. In addition, the program 1740 may include the edge enabler client 130 of FIG. 1.

The input device (including input circuitry) 1750 may receive, from the outside of the electronic device 110, a command or data to be used for a component (e.g., the processor 1720) in the electronic device 110. The input device 1750 may include, for example, a microphone, a mouse, a keyboard, or a digital pen (e.g., a stylus pen).

The acoustic output device 1755 may output an acoustic signal to the outside of the electronic device 110. The acoustic output device 1755 may include, for example, a speaker or a receiver. The speaker may be used for a general usage such as multimedia playback or recording replay, and the receiver may be used to receive an incoming call.

According to various embodiments, the receiver may be separately from or as a portion of the speaker. The display device 1760 may visually provide information to the outside (e.g., a user) of the electronic device 110. The display device 1760 may include, for example, a display, a hologram device, or a projector and control circuitry configured to control a corresponding device. According to various embodiments, the display device 1760 may include touch circuitry configured to sense a touch or sensor circuitry (e.g., a pressure sensor) configured to measure a strength of a force generated by the touch.

The audio module 1770 may convert a sound into an electrical signal or vice versa. According to various embodiments, the audio module 1770 may obtain a sound through the input device 1750 or output a sound through the acoustic output device 1755 or an external electronic device (e.g., the electronic device 1702 (e.g., a speaker or headphones)) directly or wirelessly connected to the electronic device 110.

The sensor module (including sensing circuitry) 1776 may sense an operating state (e.g., power or a temperature) of the electronic device 110 or an external environment state (e.g., a user state) and generate an electrical signal or a data value corresponding to the sensed state. According to various embodiments, the sensor module 1776 may include, for example, a gesture sensor, a gyro sensor, an inertial sensor, a barometer sensor, a magnetic sensor, an acceleration sensor, a grip sensor, a proximity sensor, a color sensor (e.g., an RGB (red, green, blue) sensor), an infrared (IR) sensor, a biometric sensor, a temperature sensor, a humidity sensor, an illuminance sensor, or sensors related to an autonomous vehicle (e.g., an inertia measurement unit (IMU), a global positioning system (GPS) sensor, a camera, a light imaging detection and ranging (LIDAR) sensor, and a radio detection and ranging (RADAR) sensor).

The interface (including interface circuitry) 1777 may support one or more designated protocols usable to be directly or wirelessly connected to an external electronic device (e.g., the electronic device 1702) of the electronic device 110. A connection terminal 1778 may include a connector through which the electronic device 110 is physically connectable to an external electronic device (e.g., the electronic device 1702). The haptic module 1779 may convert an electrical signal into a mechanical stimulus (e.g., vibrations or a motion) or an electrical stimulus of which the user may be aware through a tactile or movement sensation. The camera module 1780 may capture a still image or a moving picture. According to various embodiments, the camera module 1780 may include one or more cameras, lenses, image sensors, ISPs, or flashes.

The power management module 1788 may manage power to be supplied to the electronic device 110.

The battery 1789 may supply power to at least one component in the electronic device 110.

The communication module (including communication circuitry) 1790 may establish a direct (e.g., wired) communication channel or a wireless communication channel between the electronic device 110 and an external electronic device (e.g., the electronic device 1702, the electronic device 1704, or the server 1708) and support communication through the established communication channel. The communication module 1790 may include one or more communication processors operating independently from the processor 1720 (e.g., an AP) and supporting direct (e.g., wired) communication or wireless communication. According to various embodiments, the communication module 1790 may include a wireless communication module (including wireless communication circuitry) 1792 (e.g., a cellular communication module, a short-range communication module, or a global navigation satellite system (GNSS) communication module) and a wired communication module (including wired communication circuitry) 1794 (e.g., a local area network (LAN) communication module or a power line communication module). A corresponding communication module among these communication modules may communicate with an external electronic device over the first network 1798 (e.g., a short-range communication network such as Bluetooth, Wi-Fi direct, or infrared data association (IrDA)) or the second network 1799 (e.g., a long-range communication network such as a cellular network, the Internet, or a computer network (e.g., a LAN or a wide area network (WAN)). These types of communication modules may be integrated into one component (e.g., a single chip) or implemented by a plurality of separate components (e.g., a plurality of chips).

The wireless communication module 1792 may verify or authenticate the electronic device 110 in a communication network such as the first network 1798 or the second network 1799 using subscriber information (e.g., an international mobile subscriber identity (IMSI)) stored in the subscriber identification module 1796.

The antenna module 1797 may transmit a signal or power to the outside (e.g., an external electronic device) or receive a signal or power from the outside.

At least some of the components may be connected to each other in a peripheral device communication scheme (e.g., a bus, a general purpose input and output (GPIO), a serial peripheral interface (SPI), or a mobile industry processor interface (MIPI)) and exchange a signal (e.g., a command or data) with each other.

According to various embodiments, a command or data may be transmitted or received between the electronic device 110 and the external electronic device 1704 via the server 1708 connected over the second network 1799. Each of the electronic devices 1702 and 1704 may be the same or different type as or from that of the electronic device 110.

According to various embodiments, all or some of operations executed by the electronic device 110 may be executed by one or more external devices among the electronic devices 1702 and 1704 and the server 1708. For example, when the electronic device 110 is supposed to perform a certain function or service automatically or in response to a request from a user or another device, the electronic device 110 may request one or more of the external electronic devices 1702 and 1704 to perform at least a portion of the function or service, additionally or instead of autonomously executing the function or the service. The one or more of the external electronic devices 1702 and 1704 having received the request may execute at least a portion of the requested function or service or an additional function or service related to the request and deliver a result of the execution to the electronic device 110. The electronic device 110 may process the result as it is or perform additional processing and provide the processing result as at least a portion of a response to the request. To this end, for example, cloud computing, distributed computing, or client-server computing may be used.

The disclosed example embodiments provide a method capable of effectively transmitting video content between an edge data network and an electronic device.

While the disclosure has been illustrated and described with reference to various example embodiments, it will be understood that the various example embodiments are intended to be illustrative, not limiting. It will be further understood by one of ordinary skill in the art that various changes in form and detail may be made without departing from the true spirit and full scope of the disclosure, including the appended claims and their equivalents.

What is claimed is:

1. A method, performed by an edge data network, of transmitting video content, the method comprising:
   obtaining first bearing information from an electronic device connected to the edge data network;
   determining predicted second bearing information based on the first bearing information;
   determining a predicted first partial image corresponding to the predicted second bearing information;
   transmitting, to the electronic device, a predicted first frame generated by encoding the predicted first partial image;
   obtaining, from the electronic device, second bearing information corresponding to a first partial image;
   comparing the predicted second bearing information to the obtained second bearing information;
   generating, based on a result of the comparing, a compensation frame using at least two of a second partial image corresponding to the first bearing information, the predicted first partial image, or the first partial image corresponding to the obtained second bearing information; and
   transmitting the generated compensation frame to the electronic device based on the result of the comparing.

2. The method of claim 1, wherein the second partial image is a partial image in a first virtual reality (VR) image having a first frame index of a VR sequence including a plurality of frames, the predicted first partial image and the first partial image are partial images in a second VR image having a second frame index of the VR sequence, and each of the second partial image, the predicted first partial image, and the first partial image includes respective bearing information indicating a location of the corresponding partial image.

3. The method of claim 2, wherein the determining of the predicted first partial image comprises:
   determining the predicted second bearing information so that the first bearing information is identical to the predicted second bearing information indicating a location of the predicted first partial image in the second VR image; and
   determining the predicted first partial image based on the determined predicted second bearing information.

4. The method of claim 2, wherein the determining of the predicted first partial image comprises:
   determining a first variation between bearing information of a partial image reproduced by the electronic device before the second partial image and the first bearing information;
   determining the predicted second bearing information so that a second variation between the predicted second bearing information and the first bearing information is identical to the first variation; and
   determining the predicted first partial image based on the determined predicted second bearing information.

5. The method of claim 2, wherein the determining of the predicted first partial image comprises:
   determining a reproduction pattern based on bearing information of partial images reproduced by the electronic device before the second partial image and buffer management information of the reproduced partial images;
   generating a user-specific image reproduction model based on the determined reproduction pattern;
   obtaining the predicted second bearing information from the image reproduction model by inputting the first bearing information to the generated image reproduction model; and
   determining the predicted first partial image based on the obtained second bearing information.

6. The method of claim 2, wherein the predicted first frame includes an intra-coded frame (I frame) or a predictive-coded frame (P frame) generated by encoding the predicted first partial image.

7. The method of claim 2, wherein the second bearing information is obtained from the electronic device between a time point when a preset time elapses from a time point when the second partial image was reproduced by the electronic device and a time point when the predicted first partial image or the first partial image is predicted to be reproduced by the electronic device.

8. The method of claim 2, wherein the comparing of the predicted second bearing information to the obtained second bearing information comprises determining that the predicted second bearing information does not match the obtained second bearing information when a difference between angular components in the predicted second bearing information and the obtained second bearing information is greater than or equal to a preset threshold value.

9. The method of claim 2, wherein the compensation frame is generated to refer to the predicted first frame generated by encoding the predicted first partial image, based on determining that the predicted second bearing information matches the obtained second bearing information.

10. The method of claim 2, wherein the compensation frame is generated to include first displacement information between the first partial image and the second partial image and second displacement information between the first partial image and the predicted first partial image and to refer to the predicted first partial image and the second partial image, based on determining that the predicted second bearing information does not match the obtained second bearing information.

11. An edge data network for transmitting video content to an electronic device, the edge data network comprising:
    a network interface;
    a memory storing one or more instructions; and
    a processor configured to execute the one or more instructions,
    wherein the processor is further configured, by executing the one or more instructions, to:
      obtain first bearing information from the electronic device connected to the edge data network,
      determine predicted second bearing information based on the first bearing information,
      determine a predicted first partial image corresponding to the predicted second bearing information,
      transmit, to the electronic device, a predicted first frame generated by encoding the predicted first partial image,
      obtain, from the electronic device, second bearing information corresponding to a first partial image,
      compare the predicted second bearing information to the obtained second bearing information,
      generate, based on a result of the comparing, a compensation frame using at least two of a second partial image corresponding to the first bearing information, the predicted first partial image, or the first partial image corresponding to the obtained second bearing information, and transmit the generated compensation frame to the electronic device based on the result of the comparing.

12. The edge data network of claim 11, wherein the second partial image is a partial image in a first virtual reality (VR) image having a first frame index of a VR sequence including a plurality of frames, the predicted first partial image and the first partial image are partial images in a second VR image having a second frame index of the VR sequence, and each of the second partial image, the predicted first partial image, and the first partial image includes respective bearing information indicating a location of the corresponding partial image.

13. The edge data network of claim 12, wherein the processor is further configured, by executing the one or more instructions, to:
  determine the predicted second bearing information so that the first bearing information is identical to the predicted second bearing information indicating a location of the predicted first partial image in the second VR image, and
  determine the predicted first partial image based on the determined predicted second bearing information.

14. The edge data network of claim 12, wherein the processor is further configured, by executing the one or more instructions, to:
  determine a first variation between bearing information of a partial image reproduced by the electronic device before the second partial image and the first bearing information,
  determine the predicted second bearing information so that a second variation between the predicted second bearing information and the first bearing information is identical to the first variation, and
  determine the predicted first partial image based on the determined predicted second bearing information.

15. The edge data network of claim 12, wherein the processor is further configured, by executing the one or more instructions, to:
  determine a reproduction pattern based on bearing information of partial images reproduced by the electronic device before the second partial image and buffer management information of the reproduced partial images,
  generate a user-specific image reproduction model based on the determined reproduction pattern,
  obtain the predicted second bearing information from the image reproduction model by inputting the first bearing information to the generated image reproduction model, and
  determine the predicted first partial image based on the obtained second bearing information.

16. The edge data network of claim 12, wherein the predicted first frame includes an intra-coded frame (I frame) or a predictive-coded frame (P frame) generated by encoding the predicted first partial image.

17. The edge data network of claim 12, wherein the processor is further configured, by executing the one or more instructions, to generate the compensation frame to refer to the predicted first frame generated by encoding the predicted first partial image, based on determining that the predicted second bearing information matches the obtained second bearing information.

18. The edge data network of claim 12, wherein the processor is further configured, by executing the one or more instructions, to generate the compensation frame to include first displacement information between the firSt partial image and the second partial image and second displacement information between the first partial image and the predicted first partial image and refer to the predicted first partial image and the second partial image, based on determining that the predicted second bearing information does not match the obtained second bearing information.

19. A non-transitory computer-readable recording medium having recorded thereon a program which, when executed by a computer, causes the computer to perform edge data network operations comprising:
  obtaining first bearing information from an electronic device connected to the edge data network;
  determining predicted second bearing information based on the first bearing information;
  determining a predicted first partial image corresponding to the predicted second bearing information;
  transmitting, to the electronic device, a predicted first frame generated by encoding the predicted first partial image;
  obtaining, from the electronic device, second bearing information corresponding to a first partial image;
  comparing the predicted second bearing information to the obtained second bearing information;
  generating, based on a result of the comparing, a compensation frame using at least two of a second partial image corresponding to the first bearing information, the predicted first partial image, or the first partial image corresponding to the obtained second bearing information; and
  transmitting the generated compensation frame to the electronic device based on the result of the comparing.

* * * * *